US010868843B2

(12) United States Patent
Ethier et al.

(10) Patent No.: US 10,868,843 B2
(45) Date of Patent: Dec. 15, 2020

(54) PROVIDING SURVIVABLE CALLING AND CONFERENCING

(71) Applicant: The MITRE Corporation, McLean, VA (US)

(72) Inventors: Randall Paul Joseph Ethier, Burke, VA (US); Gene Lee Harrison, Leesburg, VA (US)

(73) Assignee: The MITRE Corporation, McLean, VA (US)

( * ) Notice: Subject to any disclaimer, the term of this patent is extended or adjusted under 35 U.S.C. 154(b) by 22 days.

(21) Appl. No.: 16/420,995

(22) Filed: May 23, 2019

(65) Prior Publication Data

US 2019/0289044 A1    Sep. 19, 2019

Related U.S. Application Data

(63) Continuation of application No. 14/537,641, filed on Nov. 10, 2014, now Pat. No. 10,305,945.

(51) Int. Cl.
  *H04L 29/08*  (2006.01)
  *H04L 29/06*  (2006.01)
  *H04L 29/14*  (2006.01)

(52) U.S. Cl.
  CPC ........ *H04L 65/403* (2013.01); *H04L 65/1073* (2013.01); *H04L 65/1096* (2013.01); *H04L 65/4076* (2013.01); *H04L 65/80* (2013.01); *H04L 67/10* (2013.01); *H04L 69/40* (2013.01)

(58) Field of Classification Search
  None
  See application file for complete search history.

(56) References Cited

U.S. PATENT DOCUMENTS

| 6,343,313 | B1 | 1/2002 | Salesky et al. |
| 7,047,300 | B1 | 5/2006 | Oehrke et al. |
| 7,552,175 | B2 | 6/2009 | Luo et al. |
| 7,987,233 | B1 | 7/2011 | Osborne et al. |
| 8,103,782 | B2 | 1/2012 | Elleuch et al. |
| 8,254,544 | B2 | 8/2012 | Saha et al. |
| 8,281,017 | B2 | 10/2012 | Handa |
| 8,315,165 | B2 | 11/2012 | Eydelman et al. |
| 2004/0190701 | A1 | 9/2004 | Biage |
| 2006/0077955 | A1 | 4/2006 | Poustchi et al. |
| 2006/0253532 | A1 | 11/2006 | Kukoleca |
| 2007/0185956 | A1 | 8/2007 | Ogle et al. |
| 2007/0285503 | A1 | 12/2007 | Asthana et al. |
| 2008/0288638 | A1 | 11/2008 | Diab et al. |
| 2009/0089683 | A1 | 4/2009 | Thapa |
| 2010/0121961 | A1 | 5/2010 | Elleuch et al. |
| 2010/0278336 | A1 | 11/2010 | Tahan et al. |
| 2010/0299552 | A1 | 11/2010 | Schlack et al. |
| 2013/0290428 | A1 | 10/2013 | Petit-Huguenin |

FOREIGN PATENT DOCUMENTS

| EP | 2111015 A1 | 10/2009 |
| WO | WO2008/119177 A1 | 10/2008 |

OTHER PUBLICATIONS

*Cisco Unified Survivable Remote Site Telephony Version 4.1*, Data Sheet, Cisco Systems, Inc., 10 pages (2008-2011).
Lennox, J. et al., "A Protocol for Reliable Decentralized Conferencing," *NOSSDAV '03*, 10 pages (Jun. 1-3, 2003).
Lu, T. et al., "Survivability—Aware Configuration Management of Service-Oriented System Based on Service Dependency," *First Joint IEEE/IFIP Symposium on Theoretical Aspects of Software Engineering (TASE '07)*, 9 pages (2007).
Mani, S.K. et al., "DSP Subsystem for Multiparty Conferencing in VoiP," *2009 3rd International Conference on Internet Multimedia Services Architecture and Application (IMSAA)*, 6 pages (Dec. 9-11, 2009).
Quercia, D. et al., "Survivable wireless networking—autonomic bandwidth sharing in mesh networks," *BT Technology Journal*, vol. 24, No. 3, pp. 99-107 (Jul. 2006).
Rosenberg, J., "A Framework for Conferencing with the Session Initiation Protocol (SIP)," Network Working Group Request for Comments: 4353, 29 pages (Feb. 2006).
Smith, P.J. et al.,"Tandem-Free Vo!P Conferencing: A Bridge to Next-Generation Networks," *IEEE Communications Magazine*, pp. 136-145 (May 2003).
Spleiss, C. and Kunzmann, G., "Decentralized Supplementary Services for Voice-over-IP Telephony," *13th Open European Summer School and IFIP TC6.6 Work5hop on Dependable and Adaptable Networks and Services. EUNICE 2007*, pp. 62-69 (2007).

Primary Examiner — Brian Whipple
(74) Attorney, Agent, or Firm — Sterne, Kessler, Goldstein & Fox P.L.L.C.

(57) ABSTRACT

Disclosed herein are system, apparatus, method and/or computer program product embodiments for providing survivable calling and conferencing. An embodiment operates by providing, by a first server, a first sub-conference to a plurality of user devices over first lines. The first sub-conference is combined with a second sub-conference to form a collective conference of the plurality of user devices. The first server accesses the conference. A second server is configured to provide the second sub-conference of the collective conference to the plurality of user devices over second lines, the first and second lines being distinct from each other. The collective conference may provide resilient and reliable sharing of information among participants and may leverage dispersed elements or diverse links simultaneously without impediments of echoes, loops, or other impacts.

20 Claims, 8 Drawing Sheets

PROVIDING SURVIVABLE CALLING AND CONFERENCING

STATEMENT UNDER MPEP 310

The U.S. government has a paid-up license in this invention and the right in limited circumstances to require the patent owner to license others on reasonable terms as provided for by the terms of Contract No. W15P7T-13-C-F600, awarded by Department of Defense.

CROSS REFERENCE TO RELATED APPLICATIONS

This application claims the benefit of U.S. Non-Provisional patent application Ser. No. 14/537,641, filed Nov. 10, 2014, titled "Providing Survivable Calling and Conferencing," which are hereby incorporated herein by reference in their entireties.

BACKGROUND

Many different communities, including national leadership, defense, disaster management, emergency response, medical, and many others, desire effective and highly reliable conferencing services. Often, these communities need these conferencing services to be survivable under, and despite, the most challenging conditions, including attacks, weather emergencies, disasters, mass casualty incidents, epidemics, and even solar superstorms.

Although there are many conferencing architectures available, few are adequate to fully satisfy the urgent requirements of the communities. Traditional conferencing architectures are vulnerable to disruptions, especially single point failures, and very few provide inherently robust and resilient operations, especially when impacted by connectivity losses, equipment outages, damage, and other traditional impediments. Also, such traditional systems do not provide sufficiently robust and effective conference and system control and management (C&M) functionalities. These challenges are often compounded by security requirements, such as system key management and distribution, rejection of compromised end instruments, addition of authorized end instruments, and related needs.

For example, in star or hub-and-spoke architectures, the conferencing functionality is traditionally within the hub node. This centralized configuration offers relatively simple conferencing among, and C&M of, the directly accessible user end instruments, via their spokes or links, including centralized security management. However, this conventional star architecture is fragile. The single failure of a spoke or link, between a user end instrument and the hub, results in the loss of conference participation with that user. Furthermore, the single failure of the hub, which contains the conferencing functionality, results in the loss of the conference for all participating users, and likely also the loss of system C&M and security.

For example, and in contrast, in mesh or multicast conferencing architectures, all of the user end instruments broadcast their media to all of the other users' end instruments which are connected to the conference. This distributed and decentralized architecture may not be as vulnerable for the conferencing functionality. However, it is also susceptible to single points of failure, such as the single links between the various participating user end instruments. In addition, the multicast conference architecture still uses a vulnerable and typically centralized C&M and security management functionality. Further, features such as splitting, merging, kicking, and muting, for example, are especially problematic in mesh or multicast conferencing architectures. Furthermore, the multicast conference configuration presents significantly more complex challenges for conference and system C&M, and especially for any required security needs.

In addition, mesh or multicast conferencing architectures may be highly susceptible to unintended or detrimental information paths and flows, typically resulting in such impacts as audio echoes or oscillations, video ghost images, packet duplication, and many other concerns.

Regardless of the selection of these conventional conferencing architectures, when impacted by sudden destruction or loss of key nodes or communications links, they traditionally provide inadequate endurance or performance regarding immediate or rapid system or conference self-reconfiguration, self-repair, reconstitution, or other survivability capabilities.

SUMMARY

Provided herein are system, apparatus, method and/or computer program product embodiments, and/or combinations and sub-combinations thereof, for providing survivable calling and conferencing.

An embodiment includes a computer implemented method for accessing a conference. The method operates by providing, by a first server, a first sub-conference to a plurality of user devices over first lines, wherein the first sub-conference is combined with a second sub-conference to form a collective conference of the plurality of user devices; and accessing, by the first server, the collective conference, wherein a second server is configured to provide the second sub-conference of the collective conference to the plurality of user devices over second lines, the first and second lines being distinct from each other, and the first server in communication with the second server.

Another embodiment includes an apparatus for accessing a conference. The apparatus includes a memory and at least one processor coupled to the memory. The processor is configured to provide a first sub-conference to a plurality of user devices over first lines, wherein the first sub-conference is combined with a second sub-conference to form a collective conference of the plurality of user devices; and access the collective conference, wherein a second server is configured to provide the second sub-conference of the collective conference to the plurality of user devices over second lines, the first and second lines being distinct from each other, and the at least one processor in communication with the second server.

A further embodiment includes a tangible computer-readable device having instructions stored thereon that, when executed by at least one computing device, cause the computing device to perform operations. The operations include providing a first sub-conference to a plurality of user devices over first lines, wherein the first sub-conference is combined with a second sub-conference to form a collective conference of the plurality of user devices; and accessing, by the at least one processor, the collective conference, wherein a second at least one computing device is configured to provide the second sub-conference of the collective conference to the plurality of user devices over second lines, the first and second lines being distinct from each other, and the at least one computing device in communication with the second at least one computing device.

BRIEF DESCRIPTION OF THE DRAWINGS

The accompanying drawings are incorporated herein and form a part of the specification.

Figure 1:
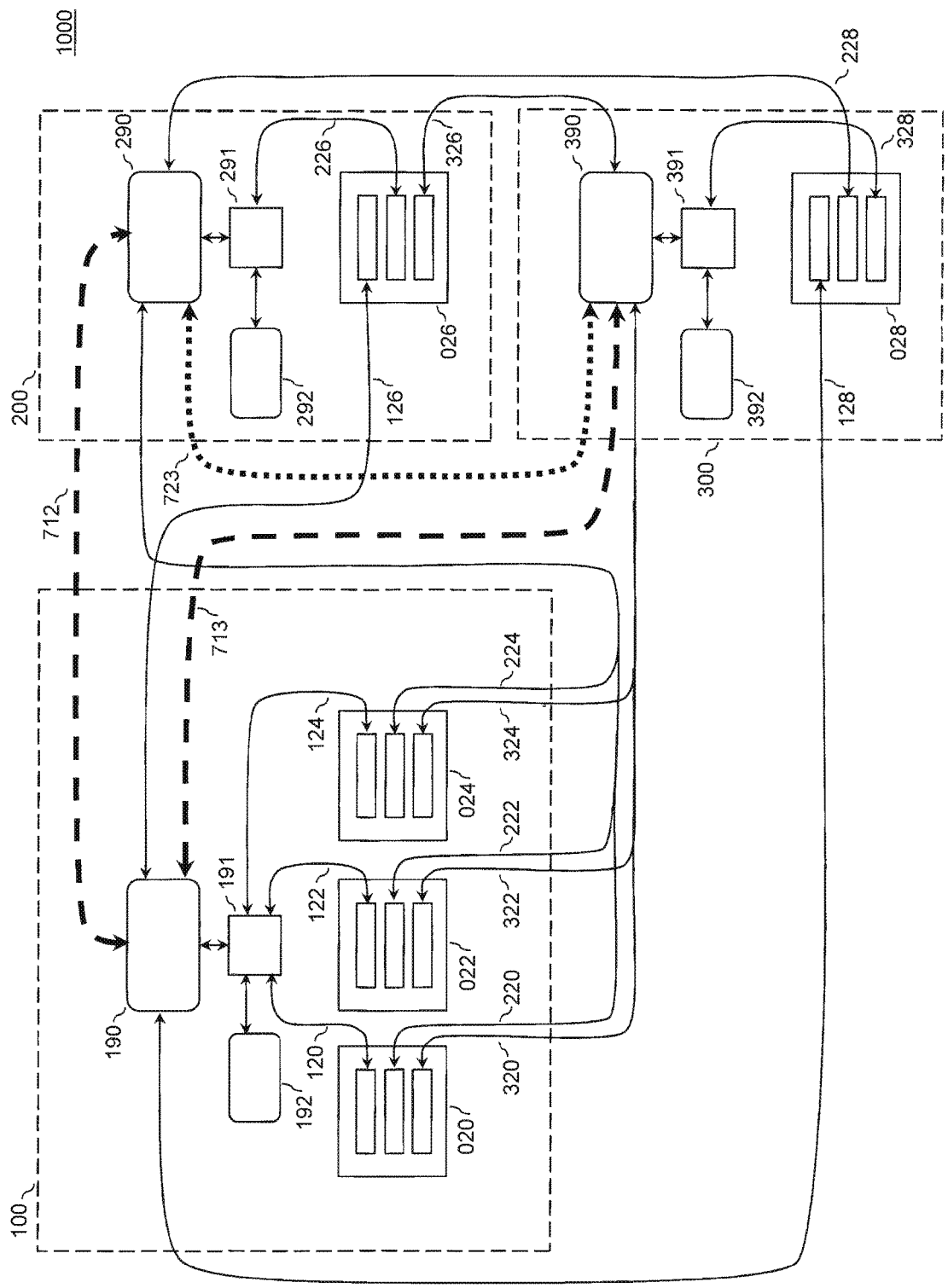
FIG. 1 is a block diagram of a calling and conferencing system, according to an example embodiment.

In the drawings, like reference numbers generally indicate identical, similar, or associated elements. Generally, the left-end digit of three digits, typically the digits "1", "2", and "3" of a three-digit reference number, indicates the associated physical or virtual server or site, or sub-conference, or served line, for the examples herein. The left-end digits may also indicate the category of device or functionality, or other association. Typically "0" indicates the physical or virtual user devices, served by the server(s) or associated with the site(s), typically via physical or virtual information transport connections or lines. Typically "7" indicates the inter-server trunks or inter-site information transport connections.

Generally, the right-most two digits indicate association with a physical or virtual user, and their associated user devices and lines, replicated at or serviced by the several servers, sites, or sub-conferences. For example, right-most two digits between "20" through "28" are user indicators for users 20 through 28, and therefore their associated three digit user devices would be "020" through "028". In another example, the right-most two of three digits between "20" through "28" are bi-directional line indicators for user devices "020" through "028", and the right-most two of three digits between "40" through "48", and "60" through "68", are unidirectional "receiving" and "transmitting", respectively, line indicators for the same user devices "020" through "028". Alternately, the right-most two of three digits, typically between "90" and "95", indicate association with a specific server, site, or network functionality, or site internal functions.

DETAILED DESCRIPTION

A collective conference architecture or process can provide survivable, resilient, and reliable human and machine conferencing of voice, video data, or other media. It can offer multiple simultaneous access and participation, dispersed infrastructures, and diverse information transports among all participating human and machine users. This can include, for example, the capability to contact any or all surviving users, via any or all surviving infrastructures and paths. The conference architecture and process can provide conferencing that eliminates impediments such as echoes, loops, feedback, and data interface, as well as other concerns.

FIG. 1 is a block diagram of an example calling and conferencing system 1000 that includes physical or virtual sites 100, 200, and 300. Sites 100, 200, and 300 can be geographically or functionally local or distant, located together, widely dispersed, or any combination thereof. While three sites 100, 200, and 300 are shown, embodiments of the invention support any quantity of sites. FIG. 1 demonstrates an embodiment with fully interconnected trunks and lines that provide three simultaneous and redundant sub-conferences to users via user devices, without loops or feedback, by muting a trunk, and which are combined into the collective conference. However, embodiments of the invention support other configurations, such as when the architecture is not fully interconnected with trunks and/or lines.

In traditional conferencing, each user is connected to and participates in a single conference via a single link or path. In a collective conference, each can be connected to one or more sub-conferences of the collective conference via one or many links or paths. A user may participate in the collective conference via any or all of the links or paths. Each user may be a physical or virtual person, a machine, a system, an entity, a sensor, an actuator, a vehicle, a functionality, or any combination thereof.

In an embodiment, one or more sub-conferences are established independently and redundantly on different physical or virtual servers, are available simultaneously to the participating users, and are combined into the collective conference. The sub-conferences are directly or indirectly connected to each other via trunks or other suitable links between the sub-conferences' servers. Each sub-conference server has one or more trunks to each of the other sub-conference servers. In an embodiment, to maximize survivability of the collective conference, all of the servers and their sub-conferences are fully combined together via multiple redundant trunks or links.

In an embodiment, users simultaneously connect to two or more sub-conferences within the collective conference and thereby achieve increased survivability and reliability. Users may connect to one, two, or more sub-conferences within the collective conference by one, two or more lines within a multiline end instrument, or by one, two or many end instruments, or any combination thereof. In an embodiment, to increase survivability of the collective conference, all users can be simultaneously connected to all of the sub-conferences.

In an embodiment, for any user, the user's operational mission needs, practical considerations, and other factors may constrain access to all sub-conferences. However, providing the maximum feasible accesses, or even multiple possible accesses, offers enhanced survivability and reliability, in contrast with the traditional single access and single server.

In an embodiment, at any point in time, a given user, such as a person, can employ an active line to one sub-conference within the collective conference. The remainder of the user's connected lines are placed on hold or are muted. As a minimum, at least one active line can be employed to participate in the conferencing. The user can transmit and/or receive media or information on any or all available and active connections. In the event of any failure or insufficiency of the active line, the user manually or automatically switches to another available and viable line by activating it, or taking it off hook, and placing on hold or discarding the failed line.

In an embodiment, a given user can be a physical or virtual entity capable of leveraging one, more, or all sub-conference connections simultaneously without unmanageable effects or impact. At any point in time, the user employs one, several, or all, active lines to one, several, or all sub-conferences within the collective conference. One, more, or all of the remainders of the user's connected lines are placed on hold or are muted. At least one active line can be employed to participate in the conferencing. The user can transmit and/or receive media or information and able on any or all available and active connections. In the event of any failure or insufficiency of any of the active lines, the user manually or automatically continues to employ the remaining viable active lines. The user may also activate, or take off hook, any other available and inactive connected lines, and places on hold or discards the failed lines. The user may also seek to establish additional or alternate lines or connections with the sub-conferences and the overall collective conference.

In an embodiment, the calling and conferencing media may be any suitable information, including voice, video, text, messaging, imagery, whiteboards, collaboration, presence, others, or any combination thereof, and can also include applications and/or storage. Media may refer to any information suitable for transport or flow among users, servers, and/or other elements.

In an embodiment, a collective conferencing architecture offers many possible physical and virtual topologies. For example, mesh and similar highly interconnected and redundant configurations are quite effective. In any of these topologies, a mechanism can be implemented to prevent the traditional adverse impacts of self-interference, such as regenerative signaling, such as unlimited media loops, echoes, ghosts, feedback, oscillations, packet duplication, or other issues, depending on the media. These effects are traditionally due to signaling loops through server trunks, user lines, or other factors. As an example, in the case of audio, the loops may result in unwanted feedback, oscillations, or audio echoes, which may render the audio unusable. As another example, in the case of video, the loops may result in ghosts or visual echoes. As yet another example, in the case of a shared desktop, the loops may result in visual image echoes of the desktops, such as those appearing to extend into the distance. As a further example, in the case of text chat, the loops may result in text echoes, repeating the text endlessly. The different architectural mechanisms discussed herein can be used to resolve these issues.

In an embodiment, a conference can be a physical or virtual entity or functionality that provides three related capabilities. First, the conference can collect or receive media or information from participating users, sources, or entities. Second, the conference can combine, select, or merge the media or information. Third, the conference can distribute, share, or transmit the processed media or information to the participating users, destinations, or entities, which are typically the same as or similar to the original sources.

In an embodiment, a server can be a physical or virtual information management process, computer, switch, bridge or any other equivalent device or method which is capable of providing calling, conferencing, sharing, and other related services. A server can be at least one of fixed, mobile, transportable, ground, surface, aerial, space borne, subsurface, subterranean, interplanetary, or any combination thereof. A server can be moving absolutely or relatively to any other server, user device, or any combination thereof. A portion or sub-conference of another or a larger collective conference may refer to a physical or virtual combination or collection of one or more participating user devices, associated users, or any other involved entities, including entities that are connected but inactive or on hold. A collective conference may refer to physical or virtual combination or collection of one or more participating portions, sub-conferences, or any other involved entities. A collective conference may additionally include user devices, associated users, and any other involved entities. A line can be a physical or virtual connection, path, channel, wires, cables, wireless links, or any other means of providing transport of media or information.

In an embodiment, a trunk is a line that provides interconnections and information transport between a pair of servers. Trunks can be optimized with special signaling, protocols, or other enhancements. Both lines and trunks may be implemented to transport information by at least one of several ways. A line or trunk can transport in full duplex, i.e. bi-directionally, over a given path or route. Alternatively or additionally, a line or trunk, may be configured to transport in half-duplex (HDX), i.e. unidirectionally, in a single direction, over a given path or route. Furthermore, two lines or trunks, transporting in a single direction each, can be paired and collectively transport bi-directional or in full duplex (FDX), over their associated or equivalently paired or separated paths or routes, which may be referred to as paired half duplex (paired HDX) or 2HDX. The ability of 2HDX to exploit independent or diverse paths or routes offers additional survivability advantages.

In an embodiment, a user device can be any physical or virtual element or entity which interfaces the collective conferencing system to or provides support to a user. A user can be a physical or virtual person, machine, process, or any other entity or activity that generates, provides, shares, receives, processes, stores, or otherwise utilizes the media or information present within or flowing through the collective conferencing system. A user device can be at least one of fixed, mobile, transportable, ground, surface, aerial, space borne, subsurface, subterranean, interplanetary, or any combination thereof. A user device can be moving absolutely or relatively to any other user device, server, or any combination thereof.

In an embodiment, a second server is configured to provide a second sub-conference of the collective conference to a plurality of second user devices over second lines. The first sub-conference can be combined with the second sub-conference to form the collective conference of the plurality of participating user devices. The first server accesses its associated first sub-conference and thereby the collective conference. The first and second lines can be physically or virtually distinct from each other. The term distinct may refer to characteristics and capabilities that physically or virtually provide or enhance viability, reliability, availability, robustness, and other advantages, based on multiple factors, such as independence, isolation, separation, autonomy, and others.

In an embodiment, the user devices may be participants in the first sub-conference, or second sub-conference, or both. If user devices are participants in multiple sub-conferences, even if some or all are inactive or on hold, they are provided with significantly enhanced redundancy, availability, reliability, robustness, and many other advantages than when participating in a traditional single conference.

In the example of FIG. 1, sites 100, 200, and 300 include servers 190, 290, and 390, respectively. Servers 190, 290, and 390 provide calling and conferencing services. Calling and conferencing services can include any single or multimedia, for examples, voice telephony, video conferencing, file sharing, presence management, terminal services, texting and messaging, whiteboard and remote desktop sharing and collaboration, telemetry, machine-to-machine signaling, any others, or any combination thereof.

In an embodiment, servers 190, 290, and 390 are digital media processors, for example Asterisk Internet Protocol (IP) Private Branch eXchange (PBX) servers, or other equivalent functionalities employed with voice-over-IP (VoIP) based services. For example, a PBX can provide information transport and connection services among multiple user devices for calling, conferencing, sharing, and many other purposes. In this example, the PBX can also support and process multiple forms of information and media, including voice, data, imagery, video, and any other form of information. For example, a small business analog telephone system, providing local voice services, plus optional calling through the area public switched telephone system (PSTN), would traditionally be designated as a PBX. Although a PBX server is provided as an example, embodiments support using any specialized server which provides similar or equivalent capabilities of a PBX server.

In an embodiment, the Asterisk or other type IP-PBX servers may be physically or virtually local or remote, relative to any of the various user devices or other PBX functionalities within the system. Each Asterisk or other type IP-PBX server can provide all of the circuit-switch PBX functionalities in an IP environment. The servers can also provide IP media server capabilities, including audio mixing, broadcasting, as well as others. These servers can also be referred to as conference bridges when providing such audio or media fusion services.

Alternatively or additionally, servers 190, 290, and 390 can be any combination of physical or virtual servers or other elements that provide calling, conferencing, or related media or information processing services. Servers 190, 290, and 390 can execute within a computer system, such as the example computer system depicted in FIG. 5. Although Asterisk or other type servers may offer significant advantages in certain situations, such as the IP or networking environment, embodiments of the invention support non-IP or other approaches.

Sites 100, 200, and 300 include or employ servers 190, 290, and 390, networks 191, 291, and 391, and management consoles 192, 292, and 392, respectively. In an embodiment, networks 191, 291, and 391 connect, provide media and information transport for, and provide communications exchanges among, their respective services, servers, user devices, and management consoles. For example, network 191 provides information transport for and communications exchanges among user device 020, user device 022, user device 024, management console 192, and server 190.

In an embodiment, each of networks 191, 291, and 391 can include an IP network, circuit-switched network, packet-switched network, voice or data radio or optical network, satellite network, local area network (LAN), wide area network (WAN), any other information transport or sharing network, or any combination thereof Sites 100, 200, and 300 include user devices 020, 022, 024, 026 and 028. In an embodiment, user devices 020, 022, 024, 026 and 028 interface to and support their associated users. User devices 020, 022, 024, 026 and 028 can be configured to provide access to the calling and conferencing services provided by servers 190, 290, and 390.

In an embodiment, each of user devices 020, 022, 024, 026 and 028 can be a single-line device, a multiline device, multiple single-line devices, multiple multiline devices, one or several Voice over IP (VoIP) or digital telephones, one or several analog or plain-old-telephone-service (POTS) telephones, voice or data radios, satellite telephones or terminals, computing systems, mobile or cellular or wireless devices, personal digital assistants or tablets, and any other information processing or transport devices, or any combination thereof. In a digital voice example, the user devices can include a commercial off the shelf (COTS) VoIP end instrument with multiple line appearances.

Figure 5:
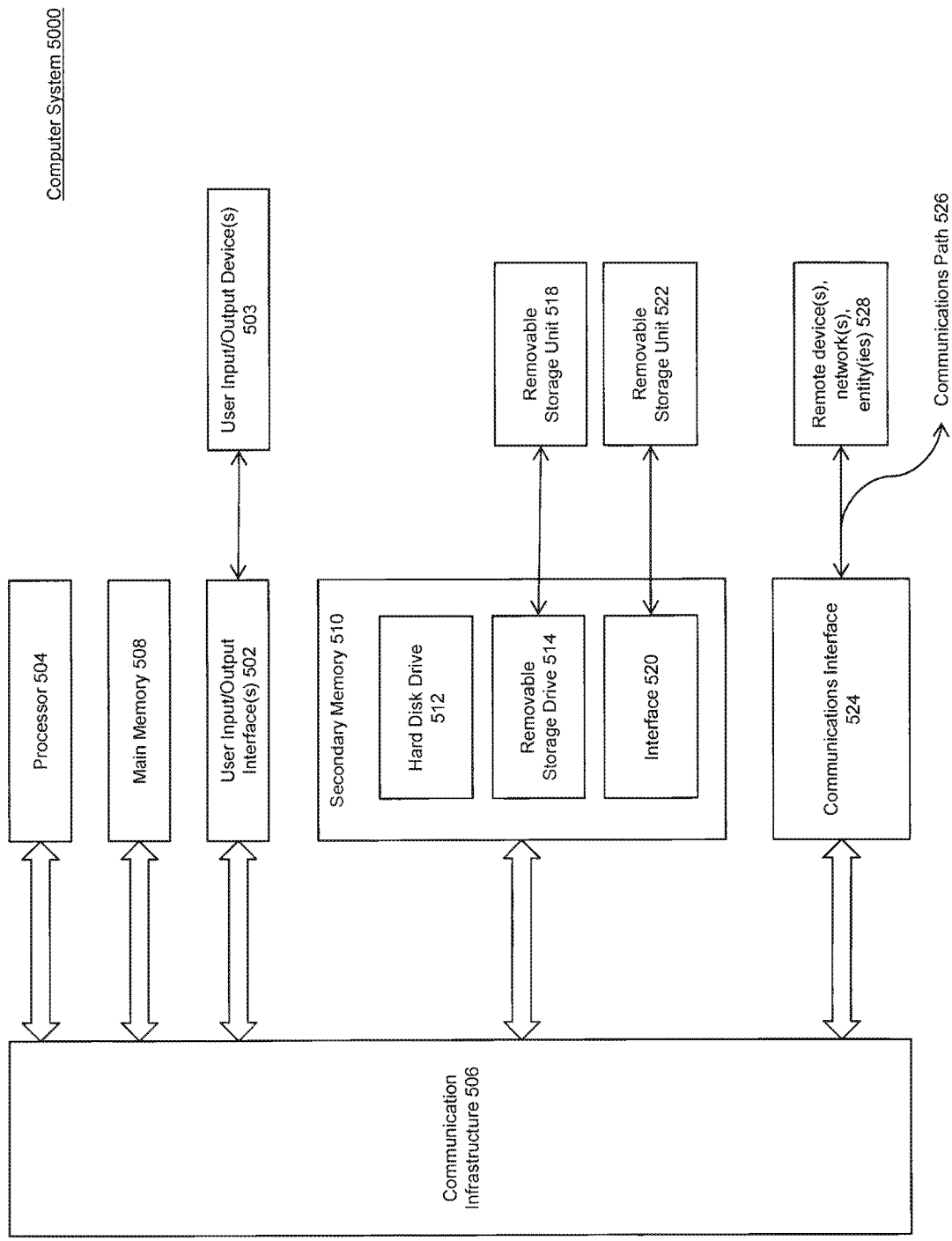
FIG. 5 is an example computer system useful for implementing various embodiments.

In another embodiment, any combination of user devices 020, 022, 024, 026 and 028 can execute within a computer system, such as an example computer system depicted in FIG. 5.

In an embodiment, any combination of user devices 020, 022, 024, 026, and 028 represent a combination of physical or virtual devices. For example, user device 020 can represent three separate devices, such as a VoIP phone that communicates over digital line 120, a computer system that communicates over network line 220, and a voice radio that communicates over wireless radio frequency transmission line 320, and all of which provide interfaces and services to the associated user of 020. A user device can also be referred to as a user instrument or an end instrument.

In an embodiment, user devices 020, 022, 024, 026 and 028 can communicate with servers 190, 290, and 390 using one or more lines. A first set of lines 120, 122, 124, 126, and 128 connects user devices 020, 022, 024, 026, and 028, respectively, to server 190. A second set of lines 220, 222, 224, 226, and 228 connects user devices 020, 022, 024, 026, and 028, respectively, to server 290. A third set of lines 320, 322, 324, 326, and 328 connects user devices 020, 022, 024, 026, and 028, respectively, to server 390. The user devices and associated servers may be physically or virtually located proximal to each other, or dispersed widely across the system and network, or any combination.

In an embodiment, a line can be used to transport, transmit, receive, or share, media, signaling, or any other information, between devices connected to or served by the line. A line can exhibit and provide several operational states as directed or needed. For example, a line can be active or off hold, during which time the line is used for media or information exchange and active participation in a call, conference, or other activity. A line can be inactive, or on hold, during which time the line is not actively used for media or information exchange in a call or conference or other activity, but it is available for participation as needed. The active, on-hold, and other states can involve active or passive supervision, signaling or other measures to maintain the current state and/or enable changes of state, such as re-establishment of active participation (for example, going off hold).

In an embodiment, a line can be muted, during which outgoing or incoming, or both, media or information are not transmitted, received, transported, shared, or otherwise processed, or any combination thereof. For example, in a one-way or lecture voice conference, the information source, such as a teacher, provides the sole voice content to the conference via the conference server, and the recipients, such as the students, are muted and do not contribute voice. These states may also be temporary and changed as necessary, such as unmuting the students for a question and answer period.

In an embodiment, a line can be a twisted-copper wire circuit in a POTS system, a virtual connection or physical path over an IP data network, a radio or optical electromagnetic wave propagation connection, a connection with a satellite through a satellite telephone or terminal, any other information transport, or any combination thereof. A line can be physically or virtually implemented over networks 191, 291, and 391, one or more other networks, trunks and inter-server connections, or any combination thereof.

In an embodiment, a line may be suitable or unsuitable for participation in a call, conference, or other activity. The line may be unsuitable when the line cannot meet a designated, objective or subjective, absolute or relative, quality of service (QoS) threshold or criteria for carrying the call, conference, or other media, signaling, or other information, including a total failure. Whether a line is suitable or unsuitable depends on several factors, including the type of media, signaling, or other information that the line is intended to provide or transport, the required, desired, or otherwise designated QoS identified, and/or the relative performance of other alternative lines or other substitutes. For example, a line that carries video for a conference can be unsuitable if the line cannot carry the video at a certain frame rate, bit rate, transmission rate, or other objective QoS metrics, or seems blurry, jittery, or otherwise undesirable, according to QoS metrics. Other quality of service metrics that can be used to determine whether a line is suitable or unsuitable can include other considerations, with objective and/or subjective QoS performance parameters, including but not limited to path or channel congestion, contention for available services or capacity, propagation or processing or other delays and jitter, intentional or unintentional interference or jamming, data or signaling errors, signal attenuation or fading, Doppler frequency or timing shifts, echoes and reflections, duplication or replication, scattering or dispersion, leakage or cross-talk, loss or compromise of confidentiality or integrity, or any combination thereof. A line which encounters a significant or total failure to provide reliable and effective media or information transport services may be referred to as broken with an approximate QoS of zero.

In an embodiment, the user devices may be VoIP end instruments that communicate with Asterisk or other type IP PBX servers over an IP-based network using interoperability standards, such as the Session Initiation Protocol (SIP) (for example, IETF RFC-3261). In SIP, Session Description Protocol (SDP) (for example, IETF RFC-4566) messages may be used to negotiate the media parameters for a session overlay on SIP messaging. The media, for example, voice media, to and from the VoIP end instruments is conveyed over Real-time Transport Protocol (RTP) (for example, IETF RFC-3550) based streams. SIP signaling and/or RTP media may terminate at the Asterisk or other type IP PBX server. The server maintains the call state(s) for the duration of the call(s) or conference(s). For example, the PBX establishes two connections for a user-to-user call: a first connection from the calling or initiating user to the PBX, then a second connection from the PBX to the called or destination user, plus an internal PBX connection between the two other connections—thereby providing the overall, end-to-end call connection and information flow between the two users, via the PBX. For a conference, the PBX establishes additional user-PBX connections, and adds them to the collective media or information sharing or flows. The PBX can provide merging of the collective media or information.

In an embodiment, one or more users of system 1000 are associated with respective user identifiers that are associated with one or more lines corresponding to lines on one or more user devices of the user. The devices can be associated with a server which provides the information and connection services. A user identifier provides a designation of the particular user, such as a person, machine, computer, process, or other entity, which is intended to utilize the associated lines and employ the media or information.

For example, in a telephony application, a first user identifier "20" corresponding to a person may be associated with three digital (for example, VoIP) or analog (for example, POTS) line buttons on a user telephone device 020 that correspond to lines 120, 220, and 320, respectively. Servers 190, 290, and 390 can provide services to user device 020, and they are physically or virtually connected to, and can receive registrations for, lines 120, 220, and 320, respectively, to register user device 020's presence and association with the first user identifier 20. In this multiple phone or multi-line phone example, in the event of any disruption or unsuitability of one of the lines associated with the user device(s) employed, another line associated with the user device can be used, and it can be manually or automatically selected and activated.

In an embodiment, the lines associated with a server can share a server identifier. The server identifier can include a prefix, suffix, or other part of a line identifier. In an embodiment, the lines associated with a user or device, for example, by a user identifier, share a device identifier. The device identifier can include a pre-fix, suffix, or other part of an identifier.

For example, each of user devices 020, 022, 024, 026, and 028 can be configured with multiple physical or virtual line appearances. An appearance provides the associated user with suitable and flexible means to obtain status of, select access to, employ, or otherwise manage, those transport lines or paths. In this example, each line that is served by or dials into server 190 has the prefix "1", each line that is served by or dials into server 290 has the prefix "2", and each line that is served by or dials into server 390 has the prefix "3". User devices 020, 022, 024, 026, and 028 have the user identifiers "20", "22", "24", "26", and "28", respectively.

In this example, the user or device identifiers may be employed as the suffix of a telephone dialing number. Thus, if the user at user device 020 dials "328" on their third line appearance, 320, user device 020 will attempt to call or contact user device 028, employing and through server 390. As an additional example, if the user dials 328 on the user device 020 first line appearance 120, the call or contact attempt will instead be initially processed through server 190, and transported through trunk 713 from server 190 to server 390, and then delivered to server 390, for final connection, termination, or otherwise call completion, to line 328 on user device 028.

In an embodiment, a dialing identifier can also provide or initiate a special functionality, such as an emergency dialing identifier. The emergency dialing identifier can include a prefix, suffix, or other part of a line identifier. For example, the emergency dialing identifier can indicate that an attempt should be made to connect to the user devices associated with a user or user identifier over any or all available and suitable or surviving lines. Although the term emergency is used in this example, the concept of emergency dialing is not limited to being used only in an emergency. Instead, emergency dialing can be employed any time this robust and flexible functionality is desired.

For example, the emergency dialing identifier may be the prefix "8". In this example, the emergency procedure could be to establish contact with a designated user, for example, by exploiting any or all existing and surviving lines and routes to that user. If a user using their associated user device 020 dials "828", user device 020 can physically or virtually start dialing, or initiate an equivalent sequence of actions in the server or system, that dials any or all of the available numbers to reach user device 028, such as "128", "228", and "328" in this example, until user device 028 is successfully reached. The lines may be tried simultaneously, sequentially, or any combination thereof. The selection of, and order in which, the different lines are tried can be pre-designated or dynamically determined, such as in order of the numbering, a preference or rank assigned to a number or server, a variety of priority and precedence algorithms or policies, assessment of metrics, such as the quality of service of the various options, adaptive response to system or network contention or congestion, or any combination thereof. The multiple calls on multiple lines may all be pursued until call completion of any or all connections to user device 028, or until the first is connected. The uncompleted calls may be discarded, abandoned, placed on hold, or any combination thereof. The specific functionalities can be configured for whatever actions and combination of actions are intended, including fixed or dynamic selection and execution, depending on situation, conditions, congestion, contention, or any other factors or metrics.

In an embodiment, a dialing identifier includes a forking identifier. The forking identifier can include a prefix, suffix, or other part of a line identifier. The forking dialing identifier can indicate that an attempt should be made to connect to the user devices associated with a user or user identifier over any or all available and suitable, or surviving, lines.

For example, the forking dialing identifier may be the prefix "9". If a user using user device 020 dials "928", user device 020 can physically or virtually start dialing or initiate an equivalent sequence of actions in the server or system that dials any or all of the available numbers to reach user device 028, such as "128", "228", and "328" in this example, simultaneously. The selection of, and order in which the different lines are tried, can be in order of the numbering, a preference or rank assigned to a number or server, a variety of priority and precedence algorithms or policies, assessment of metrics such as the quality of service of the various options, adaptive response to system or network contention or congestion, or any combination thereof. The lines may all be pursued until call completion of any or all connections to user device 028, or until the first is connected. The uncompleted lines may be discarded, abandoned, placed on hold, or any combination thereof. The specific functionalities can be configured for whatever actions and combination of actions are intended, including fixed or dynamic selection and execution, depending on situation, conditions, congestion, contention, or any other factors or metrics. In an embodiment, servers 190, 290, and 390 use emergency dialing or forking to establish or maintain calls within a conference, to provide redundant alternative connections, or any combination thereof.

In an embodiment, servers 190, 290, and 390 communicate with each other over trunks 712, 713, and 723. Trunks can be established between a pair of servers, for example, on a one-to-one or peer-to-peer basis. Trunks may be other applications of paths, links, circuits, and/or routes. Trunks may also be setup or optimized to support and enhance the particular inter-trunk exchanges, media, signaling, and other information exchanges, such as the Inter-Asterisk eXchange version 2 (IAX2) example discussed below.

In an embodiment, trunks 712, 713, and 723 are inter-IP-PBX connections. Trunks 712, 713, and 723 can be implemented using networks 191, 291, and 391, physical or virtual specially engineered paths, circuits, or routes optimized for inter-server information transport and coordination, one or more other networks, or any combination thereof.

In an embodiment, active and on-hold inter-server trunks can be manually selected, determined automatically or dynamically by a logic executed by any of servers 190, 290, and 390, commanded by management consoles 192, 292, and 392, or any combination thereof.

In an embodiment, the trunk management logic may perform any or all of the following activities. The logic can determine a list of possible network topologies, wherein each topology specifies which servers, trunks, lines, paths, circuits, routes, and/or networks are to be used, and which trunks are to be used as active trunks or on hold trunks. Each topology can include each server, for example, servers 190, 290, and 390. Topologies with a loop can be removed from the list.

A loop may refer to a condition in which the media or information flows through a system and returns upon itself. This circumstance may result in numerous impacts and effects, usually specific to the media, data, or information transport, including feedback, audio squeals and howling, echoes, ghosting, packet duplication, congestion, inefficient use of capacity and scarce resources, others, or combinations thereof. For example, two active speakerphones in the same room may experience audio oscillation or squeals, due to feedback. Therefore, audio systems are often compelled to incorporate anti-feedback or echo-cancellation elements to prevent or mitigate such adverse effects.

In an embodiment, digital systems, for example, can incorporate mitigation techniques, such as packet sequence numbering or detection and discarding of duplicates, to likewise manage adverse effects.

In an embodiment, from the remaining members of the candidate topology list, selection logic can be employed, based on pre-established or dynamically determined criteria. The criteria may include, for example, the required or desired QoS, the shortest path first, the highest data rate, the highest capacity, the lowest delay, the lowest error rate, the most reliable, the first or subsequent available, the most secure, the available CPU processing capacity of involved servers, or even a random number generator can be used to choose among the identified topologies.

In an embodiment, trunk 712 between servers 190 and 290, trunk 713 between servers 190 and 390, and trunk 723 between servers 290 and 390, are all capable of two-way, or bi-lateral, media and information transport between their servers at their end-points. In a calling and conferencing application involving three separate and site-local sub-conferences merged into a single collective conference, the sub-conference at site 100 in server 190 is connected to the sub-conference at site 200 in server 290 through trunk 712, with bi-lateral information exchange. Similarly, the sub-conference at site 100 in server 190 is also connected to the sub-conference at site 300 in server 390 through trunk 713, also with bi-lateral information exchange. With all three servers and sub-conferences interconnected by only the two active trunks 712 and 713, all sub-conferences at all three sites are merged into the collective conference with all their collective participating user devices. Trunk 723 is provided as an inactive, or on hold, alternative, or backup inter-server connection in event of failure of either trunk 712 or trunk 713. Additional discussion of trunk failures, switching to backup trunks, and avoiding loops are provided below.

Sites 100, 200, and 300 include management consoles 192, 292, and 392. In an embodiment, the management consoles 192, 292, and 392 represent the physical or virtual system control and management (C&M) capabilities for operating the entire system or any or all of its components and associated elements. The management consoles 192, 292, or 392 can be employed by physical or virtual operators, supervisors, conference or other specialized managers or coordinators, technicians, engineers, repairmen, any other roles or purposes, or any combination thereof, and the management consoles can be manually or automatically operated, or both.

For example, a site may include separate or joint management consoles for an Operator, with traditional calling and information services, a Conference Manager, for specialized coordination of conferencing among participating users and their user devices, and a Technician, for system setup, repairs, and other operations and maintenance (O&M) functions.

In an embodiment, management consoles 192, 292, and/or 392 can be local control consoles, remote control consoles, master control consoles, or any combination thereof. A local control console can control the server and system at the server's site. For flexibility, reliability, or enhanced training, each local control console may also be enabled to view the other remote sites. A local control console may also be authorized to remotely manage a remote site's server and system, given appropriate and approved policies and safeguards. A master control console may be located anywhere, at any site or elsewhere provided sufficient connectivity is available, and it can be authorized and capable of remotely observing and supervising any or all site servers and systems, and overall system operations. The master control console can also remotely access and control any or all site servers and systems as needed. This management console architecture provides significantly increased operational reliability, availability, flexibility, efficiency, and many other advantages, and it also supports training, provides redundancy, and enhances emergency back-up and restoration.

In an embodiment, management consoles 192, 292, or 392 include multiple methods of IP PBX setup, configuration, operations, and management by persons, machines, servers, or any combination thereof, including such means as local screens and keyboards, remote TELNET sessions, graphical user interface (GUI) administrative applications, other methods, or any combinations thereof. Management consoles 192, 292, and 392 can be physical or virtual functional entities, including the ability to execute within a computer system, such as an example computer system depicted in FIG. 5.

Although calling and conferencing system 1000 is depicted in FIG. 1 as having a certain quantity of sites, servers, networks, user devices, lines, trunks, management consoles, and any other elements, the conferencing system 1000 is not limited to that specific quantity, content, proximity, or configuration. For example, although three sites, 100, 200, and 300, are depicted in conferencing system 1000, conferencing system 1000 can include more or fewer sites, for example, one site, two sites, four sites, ten sites, or even a hundred or more sites. Each physical or virtual site can include any quantity or type of physical or virtual servers, user devices, networks, user devices, lines, trunks, management consoles, any other elements, or any combination thereof. The servers, user devices, networks, management consoles, and any other elements can coordinate or be in communication via any combination of lines, trunks, networks, links, or any other means. Further, although sites 100, 200, and 300, servers 190, 290, and 390, networks 191, 291, and 391, user devices 020, 022, 024, 026, and 028, lines 120, 122, 124, 126, 128, 220, 222, 224, 226, 228, 320, 322, 324, 326, and 328, trunks 712, 713, and 723, and management consoles 192, 292, and 392 are shown as physically or virtually separate elements, this is presented by way of example, and not limitation. In alternative embodiments, these elements may occupy one or more of the same physical or virtual machines, sites, systems, or any other entity.

In an embodiment, when multiple PBX servers are involved, the servers can exchange call control signaling, media, and any other information, with each other by using a variety of available protocols and methods. For example, for Asterisk and many other IP based servers, SIP, ITU-T H.323 (a suite of protocols from the International Telecommunication Union (ITU)), and other available standard and non-standard IP based protocols and methods can be used. For example, with Asterisk servers, an alternative is IAX2. The Inter-Asterisk eXchange protocol version 2 (IAX2) (for example, IETF RFC-5456) is an inter-server trunk protocol and configuration which is optimized for Asterisk servers and offers enhanced interoperability and synergy for information exchanges, and IAX2 also provides advantages over several other protocols in bandwidth efficiency and simplified firewall traversal.

Calling and conferencing system 1000 offers significantly increased reliability, availability, robustness, and survivability when providing calling and conferencing between user devices. As long as one or more viable and surviving, physical or virtual, communications paths continue to exist, between one user device and another user device, through calling and conferencing system 1000, a call or conference between the user devices can be established, and can continue to be provided, to the user devices, despite multiple and significant disruptions within conference system 1000 and its associated elements.

Figure 2:
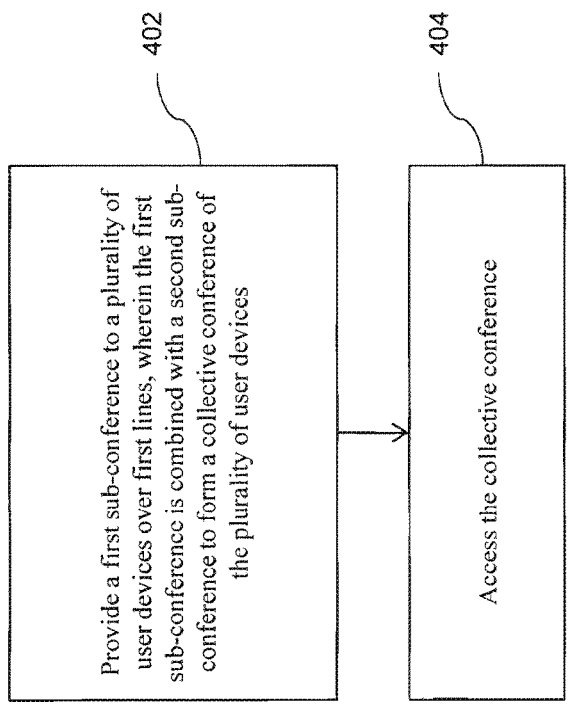
FIG. 2 is a flowchart illustrating a process for providing survivable calling and conferencing, according to an example embodiment.

FIG. 2 is a flowchart for a method 4000 for providing survivable calling and conferencing. Method 4000 can be performed by a processing logic that can comprise hardware (for example, circuitry, dedicated logic, programmable logic, microcode, etc.), software (for example, instructions run on a processing device), any other elements, or any combination thereof. For example, method 4000 may be performed by servers 190, 290, or 390.

In an embodiment, at block 402, a first sub-conference of a collective conference can be provided to a plurality of first user devices over associated first lines. A second sub-conference of a collective conference can be provided to a plurality of second user devices over associated second lines. The first sub-conference is combined with the second sub-conference to form the collective conference of the collective plurality of user devices.

In an embodiment, the first and second sub-conferences are combined with a third sub-conference form the collective conference of the plurality of participating user devices.

In an embodiment, the physical and virtual flexibility, scope, quantity, locations, and other characteristics of the collective conference, and the combined plurality of participating user devices, is determined by such factors as user and mission needs, available technology and resources, and other practical considerations.

In an embodiment in FIG. 1, first server 190 provides the first sub-conference of a collective conference to first user devices 020, 022, 024, 026, and 028 over first lines 120, 122, 124, 126, and 128, respectively. Second server 290 provides the second sub-conference of the collective conference to second user devices 020, 022, 024, 026, and 028 over second lines 220, 222, 224, 226, and 228, respectively. Third server 390 provides the third sub-conference of the collective conference to third user devices 020, 022, 024, 026, and 028 over third lines 320, 322, 324, 326, and 328, respectively. In these examples, each of the user devices 020, 022, 024, 026, and 028 are independently and simultaneously capable of interfacing to multiple servers 190, 290, and 390, through their associated independent lines. The lines used to carry the first, second, and third sub-conferences of the collective conference can include any combination of active lines or inactive lines, such as those on hold.

The first, second, and third sub-conferences of the collective conference may be combined to form the collective conference. Any of servers 190, 290, and 390, or employing any other additional servers or resources, either alone or in combination, may perform combine the first, second, and third sub-conferences of the collective conference.

In an embodiment, portions of a conference, or the conference itself, can be transmitted or exchanged between two or more servers through one or more intermediate servers or other intermediaries without being involved in a sub-conference or any other modification in any of the intermediate servers or other intermediaries. This capability of a server or other intermediate element to receive and transmit information between other servers or elements, without involvement in an internal sub-conference or other modification or employment, is functionally similar to a simple call between them and provides a transparent relay.

For example, in a single-relay case, a third portion of the collective conference can be received by first server 190 from third user device 028 via third line 328, and trunk 713, in which server 390 acts as an intermediary. As another example, in a dual-relay case, a third portion of the collective conference can be received by second server 290 from third user device 028 via third line 328, and trunks 713 and 712, in which servers 390 and 190 act as an intermediaries.

At block 404 in FIG. 2, the conference can be accessed. In an embodiment in FIG. 1, server 190 accesses the conference. For example, server 190 can access the conference by transmitting conference media or information to the conference, by receiving conference media or information from the conference, performing operations on the conference, or any combination thereof. In another embodiment, any combination of servers 190, 290, and 390 access the conference.

A first server can be configured to provide the first sub-conference of the collective conference to the plurality of first user devices over first lines, a second server can be configured to provide the second sub-conference of the collective conference to the plurality of second user devices over second lines, a third server can be configured to provide the third sub-conference of the collective conference to the plurality of third user devices over third lines. The first lines, second lines, and third lines can be physically or virtually distinct from each other.

For example, as discussed above, server 190 can be configured to provide the first sub-conference of the collective conference to first user devices 020, 022, 024, 026, and 028 using first lines 120, 122, 124, 126, and 128. Server 290 can be configured to provide the second sub-conference of the collective conference to second user devices 020, 022, 024, 026, and 028 using second lines 220, 222, 224, 226, and 228. Server 390 can be configured to provide the third sub-conference of the collective conference to third user devices 020, 022, 024, 026, and 028 using third lines 320, 322, 324, 326, and 328. Lines 120, 122, 124, 126, 128, 220, 222, 224, 226, 228, 320, 322, 324, 326, and 328 can be distinct, for example, each may be a distinct physical or virtual communication line. Lines are distinct if at least part of their physical or virtual communication paths, media, or implementations differ. Further, two or more lines may be distinct from each other even if they use part of the same network route, communication medium, or other equivalent factors.

Figure 3:
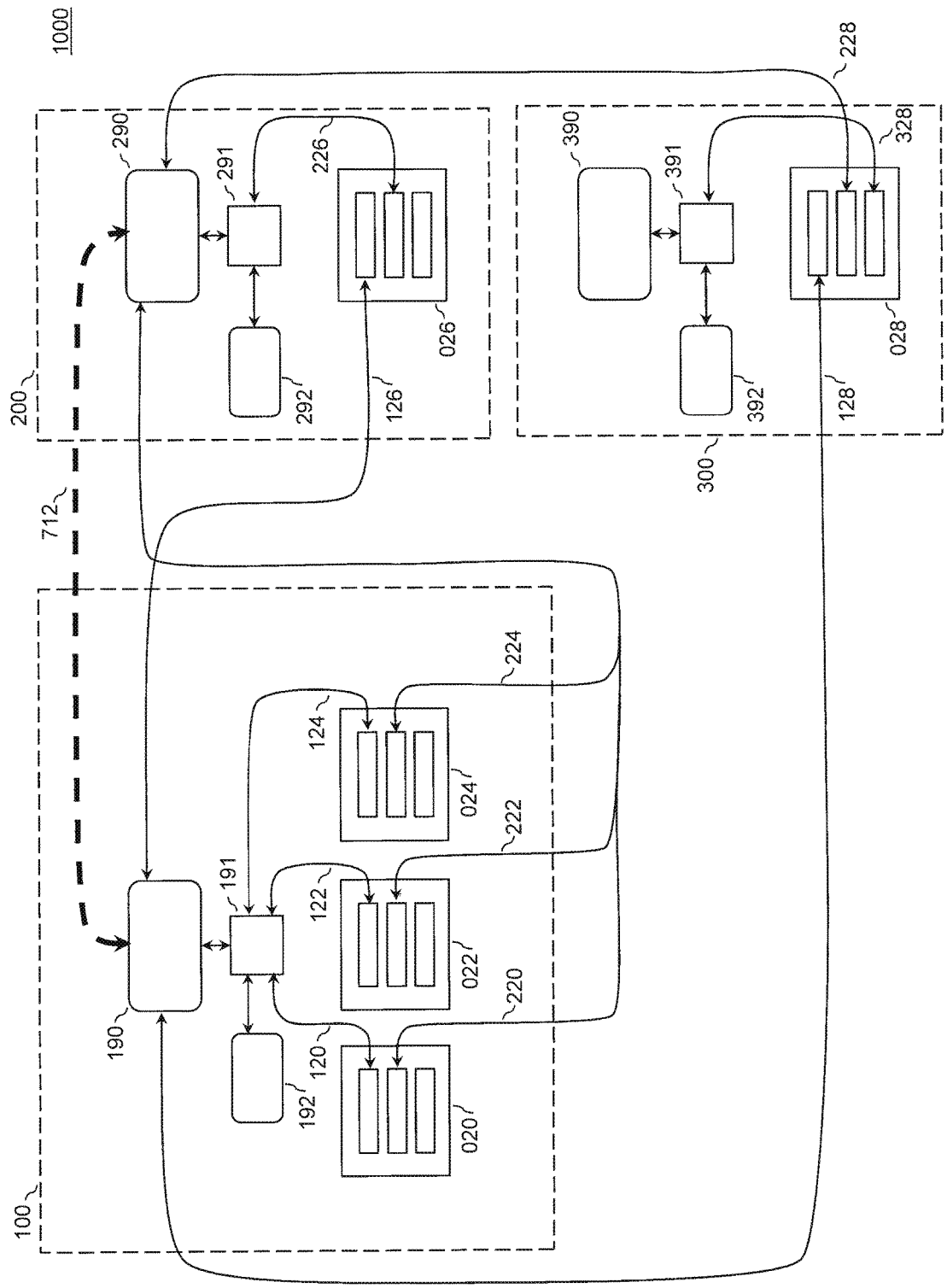
FIG. 3 is a block diagram of a calling and conferencing system, according to an example embodiment.
Figure 4:
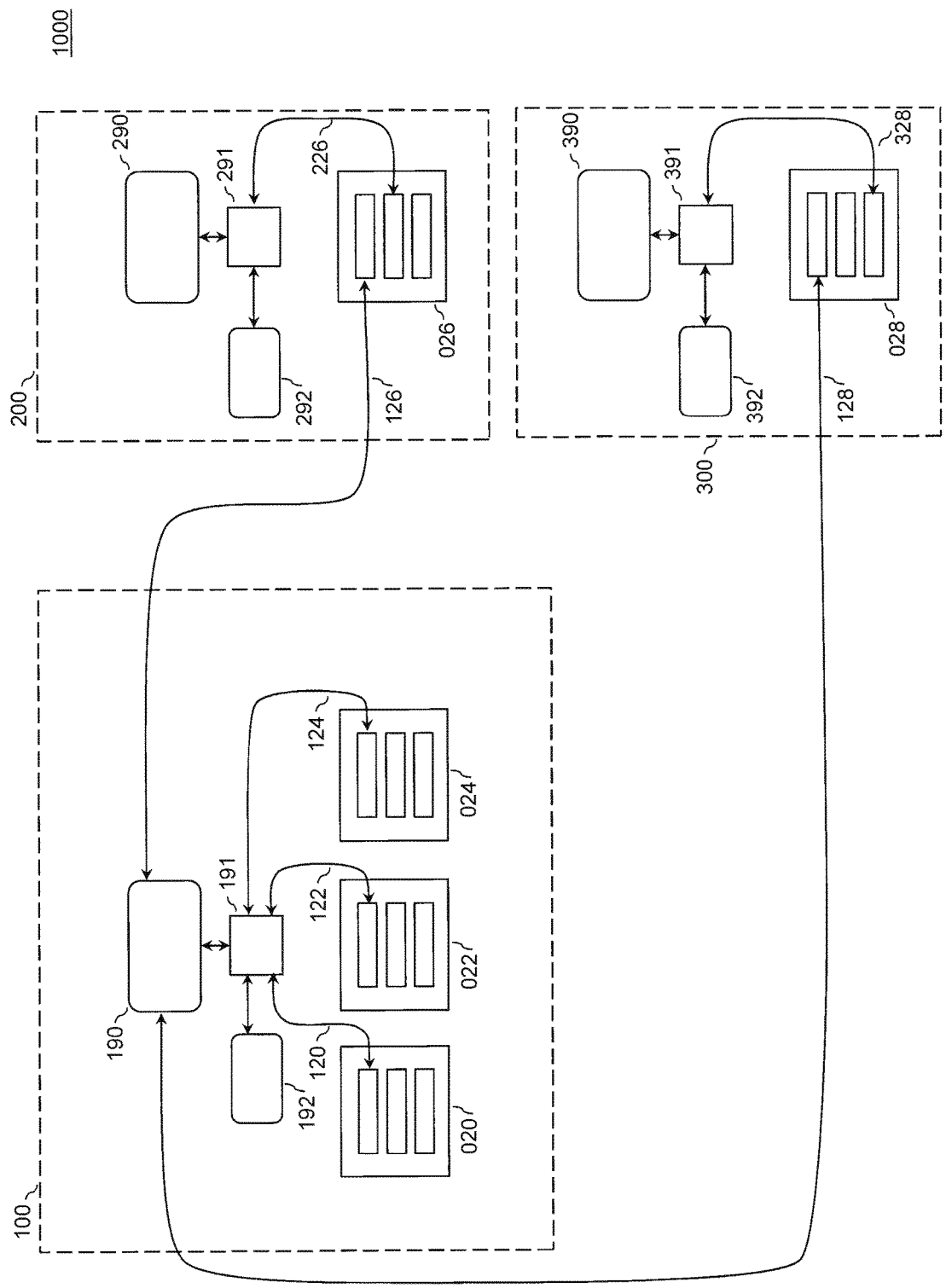
FIG. 4 is a block diagram of a calling and conferencing system, according to an example embodiment.

Referring back to FIG. 1, calling and conferencing system 1000, due to the interconnectedness of its constituent parts, provides enhanced reliability, availability, robustness, and survivability to a call or conference, especially when any or multiple lines, trunks, servers, user devices, networks, or other involved elements suffer from inadequate QoS, disruptions, loss, failures, other impediments, or any combination thereof. FIG. 3 and FIG. 4 depict examples of conferencing system 1000 suffering from such disruptions, and demonstrating continuity of operations for calls and conferences with reliability and survivability, despite them.

FIG. 3 is a block diagram of a calling and conferencing system, according to an example embodiment. FIG. 3 depicts conferencing system 1000 in which the combined collective conference among all participating user devices is maintained despite the total loss of lines 320, 322, 324, and 326, and trunks 713 and 723. System 1000 uses a combination of the surviving first lines and second lines when the third server 390 fails to provide the third portion of the sub-conference to the collective conference at a sufficiently high first quality threshold or simply experiences failures.

For example, in FIG. 3 and in system 1000, first server 190 receives first information (for example, the first portion of the conference) into a first sub-conference of a collective conference from first user devices 020, 022, and 024 via first lines 120, 122, and 124, respectively. First server 190 also receives second information (for example, the second portion of the conference) from a second sub-conference of the collective conference, provided by second user device 026 from second server 290 via second line 226 and trunk 712. First server 190 additionally receives third information (for example, the third portion of the conference) from a third sub-conference of the collective conference, provided by third user device 028 via third line 128. First server 190 combines collective information from the first, second, and third sub-conferences of the collective conference to form the collective conference information. First server 190 then transmits the combined collective conference information to first user devices 020, 022, and 024 using first lines 120, 122, and 124. First server 190 also transmits the combined collective conference information to second user device 026 via trunk 712, second server 290, and second line 226. First server 190 additionally transmits the combined collective conference information to third user device 028 via third line 128.

In an embodiment, the conference server 190, server 290, or both servers 190 and 290 continue to maintain the collective conference. Maintaining the conference refers to the capability to reliably provide continuity of participation of the user devices, previously included in the first, second, and/or third sub-conferences, in the ongoing collective conference, during and despite the disruptions.

For example in FIG. 3, third server 390 can suffer from some disruption that prevents it from providing the third sub-conference of the collective conference to one or more of the participating user devices 020, 022, 024, 026, and 028, one or more of servers 190 and 290, or any combination thereof. The disruption may be caused, for example, by a failure of one or more of lines 320, 322, 324, 326, trunk 713, trunk 723, server 390 itself, or any combination thereof.

Regardless of the failure, the disruption prevents server 390 from providing the third sub-conference to the collective conference. FIG. 3 represents the disruption of server 390 by not including lines 320, 322, 324, and 326, and trunks 713 and 723. User device 028 may still maintain a viable line 328 to server 390, but the user many not be able to participate in conferencing via that means. However, user device 028 also offers viable alternatives, including line 128 to server 190, and line 228 to server 290, which offer opportunities for continued participation in the collective conference.

In response to this disruption of the third sub-conference, server 190, server 290, or both servers 190 and 290, can provide the third sub-conference of the collective conference to the participating user devices. For example, suppose that the third sub-conference of the collective conference, previously shown in FIG. 1, is composed of the media transmitted to and from third user devices 026 and 028. In this example, server 390 provided the third sub-conference of the collective conference to user devices 026 and 028 over respective lines 326 and 328 prior to the disruption. Also, server 390 previously in FIG. 1, shared the first, second, and third sub-conferences of the collective conference with servers 190 directly via trunk 713, and server 290 indirectly via trunk 712. After the disruption, as shown in FIG. 3, server 390 can no longer collect and provide the third sub-conference of the collective conference to servers 190 and 290, nor can server 390 provide and distribute the first and second sub-conferences of the collective conference to user devices 026 and 028. Instead, servers 190 and 290, either separately or in combination, can maintain the continuity of the collective conference, including all participating user devices among the three sub-conferences of the collective conference, by using any combination of the remaining, available, and surviving lines.

For example, server 290 can provide the third sub-conference of the collective conference to user device 026 via line 226, and to user device 028 via line 228. Lines 126 and 128 can be placed on hold, during which time they remain available as backups or alternatives to carry the third sub-conference of the collective conference. Under manual or automatic control, or both, user devices 026 and 028 each then switch from lines 326 and 328, to lines 226 and 228, respectively, and user devices 026 and 028 promptly continue, or restore, conference participation.

As another example, server 190 can provide part of the third sub-conference of the collective conference to user device 026 via line 126, and server 290 can provide the other part of the third sub-conference of the collective conference to user device 028 via line 228. Lines 128 and 226 can be placed on hold, during which time they remain available as backups or alternatives to carry the third sub-conference of the collective conference. Servers 190 and 290 can then exchange media and control via trunk 712, and coordinate the integration of their respective parts of the third sub-conference of the collective conference into the continued and combined collective conference.

In an embodiment, user devices 020, 022, 024, 026, or 028 will switch among their respective associated lines and servers as needed, including the capability to switch over to other lines or servers on the conference in the event of the active line or server becoming unusable or disconnected from the conference. A user device can be configured to switch manually, automatically, or any combination thereof, with or without user intervention. A user device can switch over to another available line upon detecting the active line becoming unusable or disconnected. A user device can switch over in response to signaling received from a server, management console, a poor quality of service assessment (such as based upon RTP Control Protocol (RTCP) reports (for example, IETF RFC-3550) exchanged between the server and the user device or the absence of this periodic report indicative of a loss in communications), a timeout on an audio codec heartbeat, a timeout on a SIP signaling heartbeat, or other appropriate element or indicator. A user or user device can attempt to manually or automatically alternate route a call, or relay a call, to an intended server, via any available surviving lines, servers, and networks. A user device can attempt to join or leverage other lines, devices, servers, or other suitable elements, by any or all means, including direct dialing, emergency dialing, fork dialing, other methods, or any combination thereof.

For example, in addition to the disruptions discussed above regarding FIG. 3 and server 390, server 290 can also suffer from some disruption that prevents it from providing either the second or third sub-conferences of the collective conference to one or more of user devices 020, 022, 024, 026, and 028, one or more of servers 190 and 390, or any combination thereof. For example, the disruption may be caused by a failure of one or more lines 220, 222, 224, 226, 228, trunk 712, trunk 723, the server 290 itself, or any combination thereof. Regardless of the failure, the disruption prevents server 290 from providing either the second or third sub-conferences of the collective conference to the combined collective conference.

FIG. 4 is a block diagram of a calling and conferencing system, according to an example embodiment. FIG. 4 depicts system 1000 in which the collective conference among all participating user devices is maintained despite the loss of lines 220, 222, 224, 228, 320, 322, 324, and 326, and trunks 712, 713, and 723. System 1000 uses the surviving first lines when the third server fails to provide the third sub-conference of the collective conference to the collective conference at a sufficiently high first quality threshold, and also the second server provides the second sub-conference of the collective conference to the collective conference below a sufficiently high first quality threshold. In an embodiment, conference server 190 continues to maintain the collective conference.

FIG. 4 represents the disruption of both servers 290 and 390 by not including lines 220, 222, 224, 228, 320, 322, 324, and 326, and trunks 712, 713, and 723. User devices 026 and 028 may still maintain viable lines 226 and 328 to servers 290 and 390, respectively, but the users many not be able to participate in conferencing via those means. However, user devices 026 and 028 also offer viable alternatives, including lines 126 and 128 to server 190, which offer opportunities for backup participation.

In an embodiment, in response to these disruptions, server 190 can provide some or all portions of the conference to the user devices. After disruptions to both servers 390 and 290, server 190 maintains the conference having all three portions. Server 190 can maintain the conference between user devices 020, 022, 024, 026, and 028 using lines 120, 122, 124, 126, and 128.

Although FIGS. 3 and 4 depict calling and conferencing system 1000 responding to several example failures of servers 290 and 390 and other elements, conferencing system 1000 can provide reliable and continuing calling and conferencing services under a wide range of other conditions. These conditions can include failures of any line, trunk, network, server, user device, management console, or other element, to provide a sub-conference of the collective conference to the collective conference at or above a particular quality threshold. Further, the quality threshold, against which failures or insufficient performance are measured, can vary depending on the type of line, trunk, network, server, user device, management console, or other element, or the media or information being conveyed, or any combination thereof. In response to this variety of conditions, any user device can continue to participate in the collective conference, provided it has access to a viable, available, and surviving line or connectivity to a surviving server that continues to participate in or maintain the collective conference.

In an embodiment, the first server and second server share a portion of the collective conference over a first trunk, and the first server and third server share another portion of the joint conference over a second trunk. For example, referring back to FIG. 1, servers 190 and 290 can share conference media to or from any of the user devices over trunk 712. Likewise, servers 190 and 390 can share conference media to or from any of the user devices to or from any of the user devices over trunk 713. And servers 290 and 390 can share conference media to or from any of the user devices to or from any of the user devices over trunk 723, if inactive or muted trunk 723 is activated or unmuted.

As depicted in FIG. 1, when two active trunks are used to provide portions of the conference, a third trunk can be set to an inactive state, muted, or placed on hold, to serve as a backup or fail-over trunk. Should one of the two active trunks fail, the third trunk can be activated, unmuted, or taken off hold, and used as an active trunk to maintain the conference. For example, trunk 723 can be used as an active trunk to maintain the conference in the event that one of trunks 712 or 713 fails, or cannot carry conference media at a particular quality threshold, and therefore trunk 712 or 713 must be deactivated, muted, placed on hold, or otherwise discarded from participation. In some cases it is also desirable to keep the third trunk 723 on hold to prevent feedback or signal loop or other issues that are possible when all three trunks are operating simultaneously.

In an embodiment, a server may detect failure of a trunk to carry conference media at a quality threshold by using suitable physical or virtual status and connectivity monitoring and assessment methods, such as heartbeat signaling. For example, a SIP call, without media in either direction, can be established between each of the any or all possible pairs of servers, over each of the trunk(s) between them. The SIP UPDATE or re-INVITE headers, Session Timers, and Min-SE per RFC-4028, can be used to implement a persistent SIP signaled heartbeat between servers interconnected by way of a trunk. If and when SIP call processing of the heartbeat by a server determines that the trunk, or the other associated server, or both, are no longer viable, another trunk can be selected. They may be considered not viable when any failure, or insufficient quality of service condition, is detected, such as when the trunk or other server is unreachable, when either or both fail to properly respond, when either or both become otherwise dysfunctional or unreliable, when any unacceptable condition occurs, or any combination thereof. If and when a recovery from an outage or non-viable condition occurs, the same or equivalent status and connectivity monitoring and assessment methods can be employed to confirm the returned viability of the trunk and the other server. When viability is validated, the topology selection process can be used to select a network topology from a list of viable topologies, and to restore, maintain, and potentially optimize the trunk(s) and connectivity among the associated servers.

In another embodiment, RTP Control Protocol (RTCP) reports, a.k.a. RFC-3550, or another quality of service monitoring mechanism, is used by a server to determine if the trunk and other server is viable or not. If the information in the RTCP reports indicates that a failure has occurred, the quality of the service is insufficient so that the calls or signaling between these two servers is no longer viable, or if the other server fails to send its RTCP reports, then the trunk between these two servers is deemed non-viable and another trunk is selected. If RTCP exchanges are not promptly restored via the replacement trunk, or if the RTCP reports or any other diagnostic methods indicate that the failure has occurred in the other server itself, then both another trunk and another server are selected.

In an embodiment, as depicted in FIG. 1, the first server 190 and the second server 290 share a portion of the conference over a first trunk 712, and the first server 190 and the third server 390 also share a portion of the conference over a third trunk 713, as described above. The second server 290 and third server 390 have the potential to also share yet another portion of the conference over a third trunk 723.

For example, servers 290 and 390 can share conference media to or from any of the user devices over trunk 723. As discussed above, when trunks 712, 713, and 723 are all active and providing conference media to and from their associated servers and user devices simultaneously, feedback or other impairment or impacts can occur, such as due to the media or information loop conditions or other issues.

In an embodiment, the communications to and from the servers can be configured to manage, mitigate, or eliminate these feedback and related issues.

For example, feedback of audio or video media is frequently encountered in analog systems, typically presenting oscillations or echoes, or combinations thereof. For example, feedback involving certain digital media, such as IP packet protocols, may present packet duplication, unintentional packet flooding effects, waste of capacity and resources and other issues.

In an embodiment, digital systems may mitigate these impacts or effects by leveraging such methods as packet sequence numbering, flow management methods, firewall filtering, or other techniques. Such approaches, when implemented effectively, would allow inter-server trunk 723 to be active rather than inactive, even when inter-server trunks 712 and 713 are active. This would also offer immediate alternate communications services upon event of a failure or impediment of other trunks.

The collective conference system C&M capability, which may be manual or automatic or any combination thereof, provides the means to detect the failure or insufficient QoS of either active trunks 712 or 713. Upon such event, the C&M system can deactivate, or place on hold, the rejected trunk, and then activate, or take off hold, trunk 723 as a replacement. In an embodiment, only two of the three trunks may be active at any given time. The third trunk must be inactive, or placed on hold to prevent the formation of a media or information flow loop, as previously described. If an audio conference among three sites is established with unintended interconnection of three active trunks in such a configuration, the participants may experience significant audio echoes, squeals, and other adverse impacts. A significant challenge is the ability to implement an inter-server trunking capability that enables immediate or sufficiently prompt restoration of the conference with little or no delays or significant C&M effort or impacts.

The quantity of possible trunks among participating servers can grow rapidly with added servers, thus increasing the C&M of the trunks, especially the muting and other necessary functions. For star type architectures, for example, the possible trunks increase linearly. For mesh type architectures, for example, the possible trunks increase exponentially. For large networks, the trunk C&M may become challenging, especially when attempting to dynamically control information flows, for example, by rapidly sensing and muting or unmuting multiple trunks.

In an embodiment, the loop feedback problem is solved while simultaneously using in the active mode multiple inter-server trunks. In addition, the C&M burden can be greatly reduced if many or all trunks simply remain active and in use for needed transport services. For example, in voice systems, audio feedback can be eliminated without muting trunks. For example, in digital systems, data packet duplication can be eliminated without packet sequence numbering, flow management methods, firewall filtering, or other techniques.

In an embodiment, the following behaviors may be followed by each of the conference servers. First, each server will broadcast to the other conference servers the mixed conference media from its registered user devices, but each server does not broadcast to the other servers the conference media that it receives from the other conference servers. Second, each server will also broadcast to its registered user devices the mixed conference media it received from all of its user devices, plus the conference media it receives from the other servers.

In an embodiment, the abilities of the user devices may be leveraged to independently process and service the user with the conference media or other information. For example, with audio media, the user device would provide received conference audio to the user, for example, listening. Simultaneously, the user device may send user audio into the conference, for example, talking. The capability to isolate and process these two different information flows is commonly termed duplex operation, and the capability to perform both processes simultaneously is commonly termed full duplex operation. An additional implementation consideration is the ability to prevent, or minimize, potential cross-coupling, interactions, or interference between the two different media or information flows, which may produce undesirable impacts, such as echoes, feedback, ghosts, packet duplication, or other issues. This full-duplex capability is often available, for example, internally within currently available VoIP user devices, or specially engineered audio user devices, similar to POTS. Historically, conventional audio telephony systems encountered echoes, feedback, and other impacts in calls and conferences. These effects often compelled the development and employment of anti-echo and anti-feedback systems. For contemporary VoIP and similar systems, their internal architectures often provide equivalent full-duplex signal management, but it may not be readily accessible externally through the traditional VoIP calling and signaling protocols and methods. For the enhanced anti-feedback and related capabilities discussed herein, the two separate audio or information streams are leveraged.

Figure 6:
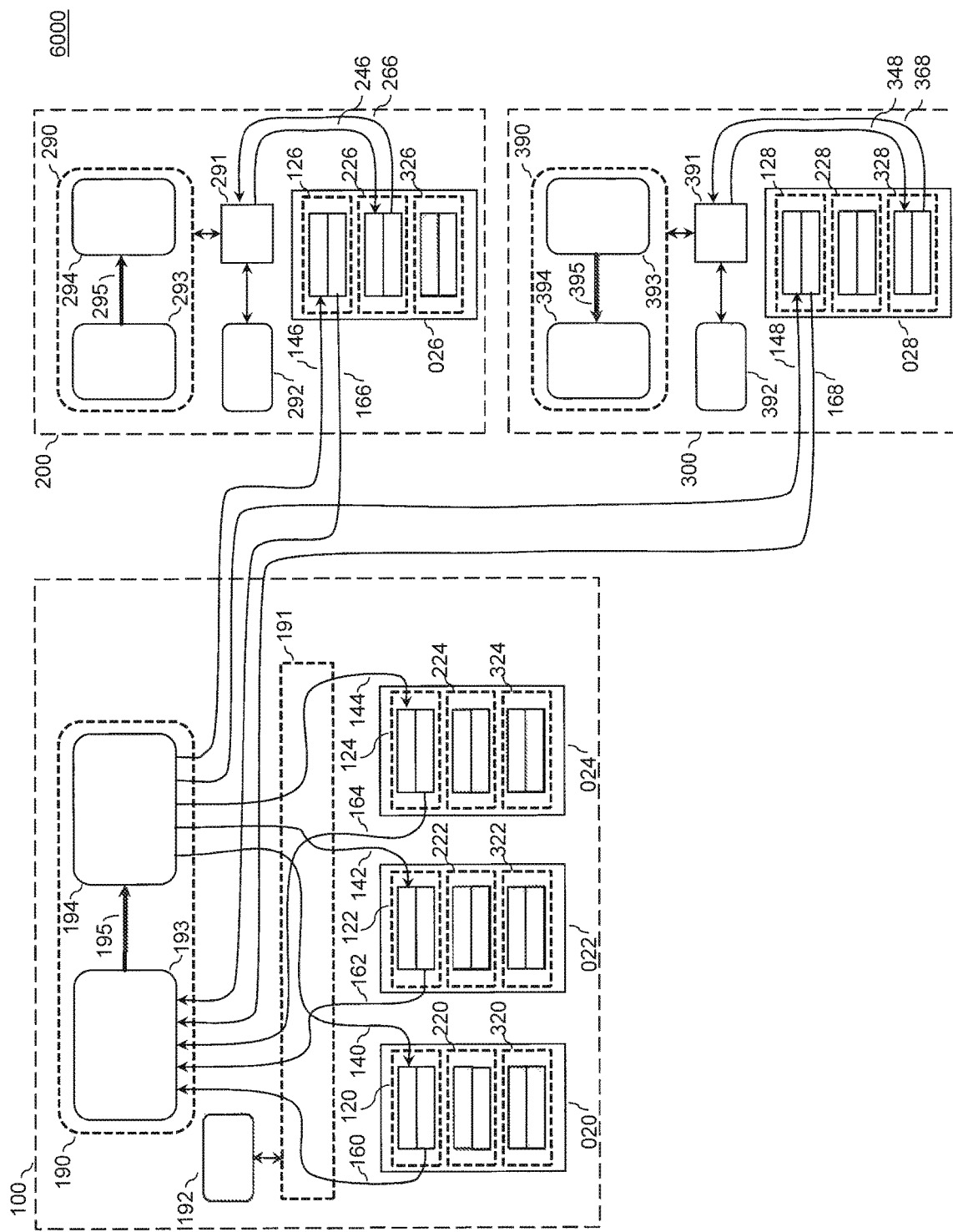
FIG. 6 is a block diagram of a calling and conferencing system, according to an example embodiment.
Figure 7:
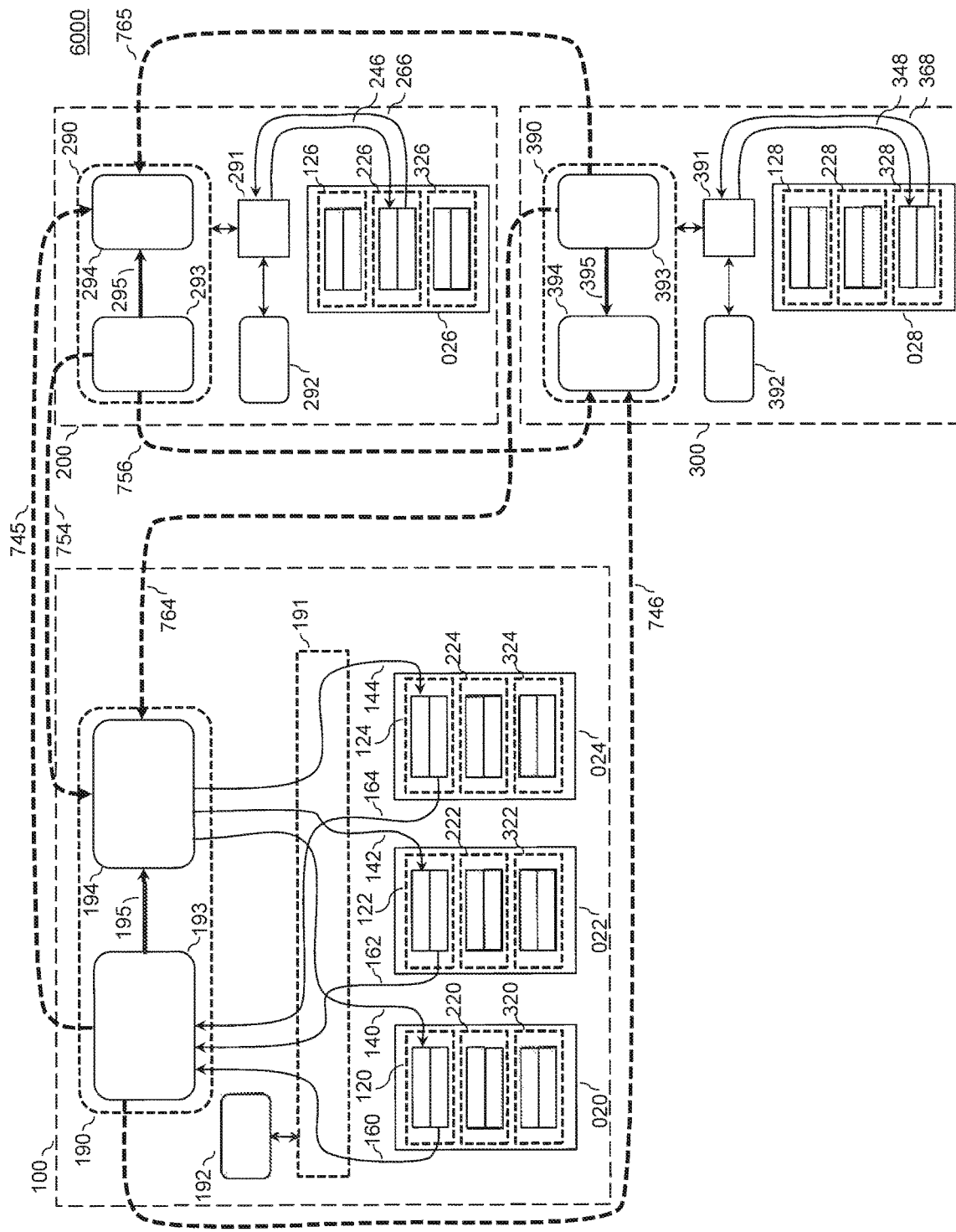
FIG. 7 is a block diagram of a calling and conferencing system, according to an example embodiment
Figure 8:
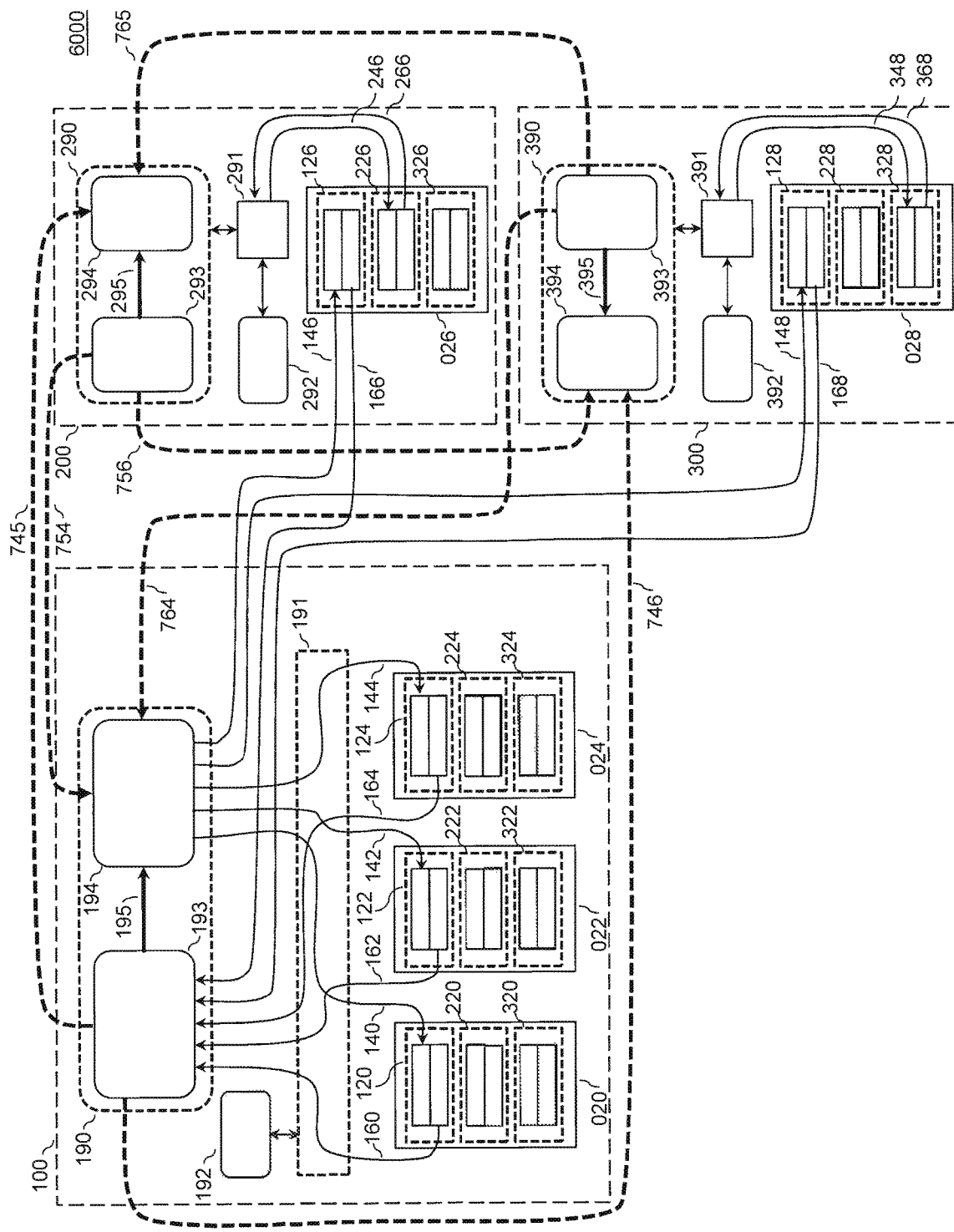
FIG. 8 is a block diagram of a calling and conferencing system, according to an example embodiment.

FIG. 6, FIG. 7 and FIG. 8 depict conferencing system 6000 in several states of functionality. Conference system 6000 is similar to conference system 1000, as depicted in FIG. 4, FIG. 3 and FIG. 1, respectively, except that the previous FDX trunks and lines have been replaced by 2HDX trunks and lines, respectively. Two limited-functionality example failure scenarios will be described first (FIG. 6 and FIG. 7) before describing the scenario of a fully functioning system (FIG. 8).

FIG. 6 depicts conferencing system 6000 with total loss of all 2HDX trunks, and all cross-site but non-first 2HDX lines. In this case, conference system 6000 provides one surviving sub-conference to all users via user devices, without loops or feedback, due to 2HDX, and which continues the collective conference. System 6000 in FIG. 6 is similar to system 1000 as depicted in FIG. 4, and it provides equivalent or similar capabilities and functionalities. However, FIG. 6 also presents additional detail. For example, in FIG. 4, each user device is represented by a physical or virtual single small box, plus a connected single arrow with two arrowheads, which indicates the bi-lateral, or two-way, FDX flow of information, typically over the same physical or virtual media or path. Each user device in FIG. 4 has the capability to receive information, process information, and send information, whether simultaneously, sequentially, or any other combination. For example, in FIG. 6, each user device is now represented by a physical or virtual pair of co-located small boxes, plus a connected pair of arrows with single arrowheads, which indicates the separated yet bi-lateral, or two-way, 2HDX flow of information, over a pair of physical or virtual media or paths, and typically over the same, as a pair. Each user device therein again has the capability to receive information, process information, and send information, normally simultaneously, but may be sequentially or any other combination, and in FIG. 6, these flows may be managed independently.

In an embodiment, in system 6000 of FIG. 6 at site 100 for user device 020, the physical or virtual FDX line 120 is subdivided into two HDX components, 160 & 140, which thus form a 2HDX pair of lines. Element 160 acquires media or information to the calling and conferencing system from the user, sources, or processes in an appropriate form. Element 140 provides outputs from the calling and conferencing system to the user, destinations, or processes in an appropriate form.

In an embodiment, in system 6000 at site 100, the call and conference server 190 is subdivided into three primary components, 193, 194, and 195. Element 193 acquires inputs to the calling and conferencing server from the connected and served user devices, and their sources, processes, or other means. Then element 193 also merges, combines, selects, or otherwise processes the media or information into a product for distribution, then transports the resultant information stream via line or path 195 to element 194. Element 194 provides the combined result media or information from the calling and conferencing server to the connected and served user devices, and their destinations. In these examples, the user devices and servers at sites 200 and 300 are configured in a similar manner as site 100.

In an embodiment, in FIG. 6, the calling and conferencing server is configured for a conference among user devices 020, 022, 024, 026, and 028, through site 100 and server 190. For example, FIG. 6, first user devices 020, 022, 024, 026 and 028 are registered to first server 190 via first lines 140 & 160, 142 & 162, 144 & 164, 146 & 166, and 148 & 168, respectively. Element 193 of server 190 receives or collects the inputs from the user devices on lines 160, 162, 164, 166, and 168, then combines the received media or information, and provides the result internal to server 190 to element 194 over connection 195. Element 194 of server 190 distributes or transmits the resulting combined conference media or information to the participating user devices via lines 140, 142, 144, 146, and 148. For example, all participating first user devices may participate and share in a first sub-conference through first server 190, and the associated first lines.

In an embodiment, system 6000 can be configured to eliminate feedback and loop impacts, while simultaneously employing two or more servers and two or more active trunks.

FIG. 7 depicts system 6000 with total loss of all cross-site 2HDX lines, but with viable 2HDX trunks, and in this case providing three reduced but surviving sub-conferences to all users via user devices without loops or feedback. For example, in FIG. 7, first user devices 020, 022, and 024 are registered to first server 190 via first lines 140 & 160, 142 & 162, and 144 & 164, respectively. Second user device 026 is registered to second server 290 via second lines 246 & 266. Third user device 028 is registered to third server 390 via third lines 348 & 368. In this initial configuration, as described to this point, the first, second, and third sub-conferences hosted by servers 190, 290, and 390, respectively, are independent and isolated from each other.

To merge the three sub-conferences into the collective conference, the participating servers employ their associated inter-server trunks in the manner discussed below.

In an embodiment, in FIG. 7, between sites 100 and 200 and servers 190 and 290, the physical or virtual FDX trunk 712 in FIG. 4 is subdivided into two primary components, HDX trunk 745 and HDX trunk 754. Each HDX trunk provides a unilateral information flow, and as a 2HDX pair, they provide full duplex media or information transport between their associated servers. This paired trunk 2HDX full duplex functionality is similar to the paired lines 2HDX full duplex functionality associated with the user devices, previously described in FIG. 6. Trunk 745 accepts the combined results of user devices 020, 022, and 024, via lines 160, 162, and 164, as the output from element 193 of server 190, transports it between the servers, and then delivers the media or information to element 294 of server 290. Trunk 754 accepts the combined results of user device 026, via line 266, as the output from element 293 of server 290, transports it between the servers, and then delivers the media or information to element 194 of server 190.

In an embodiment, element 194 of server 190 combines the merged media or information provided by element 193 via link 195, with the media or information provided by element 293 of server 290 via trunk 754. Then, element 194 provides the collective merged media or information to user devices 020, 022, and 024 via lines 140, 142, and 144. This media or information consists of the collective inputs from user devices 020, 022, 024, and 026, via lines 160, 162, 164, and 266, plus element 293 via trunk 754. At site 200, element 294 of server 290 combines the merged media or information provided by element 293 via link 295, with the media or information provided by element 193 of server 190 via trunk 745. Then, element 294 provides the collective merged media or information to user device 026 via line 246. This media or information consists of the collective inputs from user devices 020, 022, 024, and 026, via lines 160, 162, 164, and 266, plus element 193 via trunk 745.

In an embodiment, in FIG. 7, the first and second sub-conferences, hosted by first server 190 and second server 290, respectively, are combined into a collective conference, and all of their participating user devices receive the same combined media or information. As described to this point, the third sub-conference and third server 390 is still independent and isolated from the first and second sub-conferences. In an embodiment, the two trunks 745 and 754 are active and operational between the two servers 190 and 290, and this configuration prevents the occurrence of loop conditions, feedback, packet duplication, or the other associated and traditional impacts and impediments.

In an embodiment, calling and conferencing system 6000 can be configured to eliminate feedback while using three simultaneously active trunks or pairs, and three participating servers. Referring to FIG. 7, similar to associated trunk 745, trunk 746 accepts the combined results of user devices 020, 022, and 024, via lines 160, 162, and 164, as the output from element 193 of server 190, transports it between the servers, and then delivers the media or information to element 394 of server 390. At site 300, trunk 764 accepts the combined results of user device 028, via line 368, as the output from element 393 of server 390, transports it between the servers, and then delivers the media or information to element 194 of server 190. Similar to associated trunk 754, trunk 756 accepts the combined results of user device 026, via line 266, as the output from element 293 of server 290, transports it between the servers, and then delivers the media or information to element 394 of server 390. Similar to associated trunk 764, trunk 765 accepts the combined results of user device 028, via line 368, as the output from element 393 of server 390, transports it between the servers, and then delivers the media or information to element 294 of server 290.

In an embodiment, at site 300, and similar to the previous descriptions for servers 190 and 290, element 394 of server 390 combines the merged media or information provided by element 393 via link 395, with the media or information provided by element 193 of server 190 via trunk 746 plus element 293 of server 290 via trunk 756. Then, element 394 provides the collective merged media or information to user device 028 via line 348. This media or information comprises the collective inputs from user devices 020, 022, 024, 026, and 028, via lines 160, 162, 164, 266, and 368, plus element 193 via trunk 746 and element 293 via trunk 756. At site 100, element 194 of server 190 combines the merged media or information provided by element 193 via link 195, with the media or information provided by element 293 of server 290 via trunk 754, plus element 393 of server 390 via trunk 764. Then, element 194 provides the collective merged media or information to user devices 020, 022, and 024 via lines 140, 142, and 144. This media or information comprises the collective inputs from user devices 020, 022, 024, 026, and 028, via lines 160, 162, 164, 266, and 368, plus element 293 via trunk 754 and element 393 via trunk 764. At site 200, element 294 of server 290 combines the merged media or information provided by element 293 via link 295, with the media or information provided by element 193 via trunk 745 and element 393 via trunk 765. Then, element 294 provides the collective merged media or information to user device 026 via line 246. This media or information comprises the collective inputs from user devices 020, 022, 024, 026, and 028, via lines 160, 162, 164, 266, and 368, plus element 193 via trunk 745 and element 393 via trunk 765.

In an embodiment, as described to this point, the first, second, and third sub-conferences, hosted by first server 190, second server 290, and third server 390, respectively, are combined into a collective conference, and all of their participating user devices receive the same combined media or information. In an embodiment, all three 2HDX trunk pairs 745 & 754, 746 & 764, and 756 & 765, are active and operational, between the three servers 190, 290, and 390.

In an embodiment, this configuration prevents the occurrence of loop conditions, feedback, packet duplication, or the other associated impacts and impediments.

In an embodiment, the configuration depicted in FIG. 7 is extended and implemented across additional sites, servers, user devices, trunks, lines, or other elements, without limit.

FIG. 8 demonstrates an example system 6000 with fully interconnected 2HDX trunks and 2HDX lines, and providing three simultaneous and redundant sub-conferences to all users via user devices, without loops or feedback, due to 2HDX, and which are combined into the collective conference. In FIG. 8, sites 200 and 300 are connected internally, and cross-connected with the other sites, in like manner to site 100, but for clarity, these internal and cross connections are not illustrated therein, however they are specified in the following descriptions. In FIG. 8 and system 6000, the capabilities of FIG. 1 and system 1000 are replicated, with the addition of the 2HDX lines and trunks depicted and described in FIG. 6 and FIG. 7.

In an embodiment, multiple servers at multiple sites establish a survivable collective conference over multiple trunks among the servers and multiple lines to the user devices that provide resilience and robustness to failures and performance impairments, with the additional elimination of traditional impacts of feedback, oscillations, and other related impacts.

In FIG. 8, each server at each site establishes a sub-conference among all participating user devices, at both their sites and others, and then the multiple servers combine their multiple sub-conferences into the combined collective conference. For example, at site 100, element 193 of server 190 collects and combines the media or information from user devices 020, 022, 024, 026, and 028 via lines (shown) 160, 162, 164, 166, and 168. Then element 194 of server 190 combines the merged media or information provided by element 193 via link 195, with the media or information provided by element 293 of server 290 via trunk 754, plus element 393 of server 390 via trunk 764. Then, element 194 provides the collective merged media or information to user devices 020, 022, 024, 026, and 028 via lines (shown) 140, 142, 144, 146, and 148. This media or information comprises the collective inputs from user devices 020, 022, 024, 026, and 028, via lines (shown) 160, 162, 164, 166, and 168, via server 190, plus lines (not shown) 260, 262, 264, 266, and 268 between user devices 020, 022, 024, 026, and 028 and server 290 via server 290, plus lines (not shown) 360, 362, 364, 366, and 368 between user devices 020, 022, 024, 026, and 028 and server 390 via server 390.

Continuing the example, at site 200, element 293 of server 290 collects and combines the media or information from user devices 020, 022, 024, 026, and 028 via lines (not shown) 260, 262, 264, 266, and 268. Then element 294 of server 290 combines the merged media or information provided by element 293 via link 295, with the media or information provided by element 193 of server 190 via trunk 745, plus element 393 of server 390 via trunk 765. Then, element 294 provides the collective merged media or information to user devices 020, 022, 024, 026, and 028 via lines (not shown) 240, 242, 244, 246, and 248. This media or information comprises the collective inputs from user devices 020, 022, 024, 026, and 028, via lines (shown) 160, 162, 164, 166, and 168, via server 190, plus lines (not shown) 260, 262, 264, 266, and 268 between user devices 020, 022, 024, 026, and 028 and server 290, via server 290, plus lines (not shown) 360, 362, 364, 366, and 368 between user devices 020, 022, 024, 026, and 028 and server 390, via server 390.

Continuing the example, at site 300, element 393 of server 390 collects and combines the media or information from user devices 020, 022, 024, 026, and 028 via lines (not shown) 360, 362, 364, 366, and 368. Then element 394 of server 390 combines the merged media or information provided by element 393 via link 395, with the media or information provided by element 193 of server 190 via trunk 746, plus element 293 of server 290 via trunk 756. Then, element 394 provides the collective merged media or information to user devices 020, 022, 024, 026, and 028 via lines (not shown) 340, 342, 344, 346, and 348. This media or information comprises the collective inputs from user devices 020, 022, 024, 026, and 028, via lines (shown) 160, 162, 164, 166, and 168, via server 190, plus lines (not shown) 260, 262, 264, 266, and 268 between user devices 020, 022, 024, 026, and 028 and server 290 via server 290, plus lines (not shown) 360, 362, 364, 366, and 368 between user devices 020, 022, 024, 026, and 028 and server 390 via server 390.

In an embodiment, a collective conference provides multiple participating users and user devices with reliable and survivable calling and conferencing services using multiple redundant accesses to the collective conference across multiple redundant servers via multiple redundant links, trunks, or other paths. For example, every user device can receive the collective conference inputs from every other user device, and every user can have access to every one of their associated user devices. The user and the user devices may manually or automatically select any of the available accesses. Therefore, the collective conference can establish and provide full calling and conferencing services.

In an embodiment, the collective conference may lose any, many, or almost all of the participating user devices, servers, links, trunks, or other involved elements, and still provide survivable calling and conferencing services. In an embodiment, if the system 6000 depicted in FIG. 8 lost connectivity on every beyond-site server-to-user-device line, the collective conference would continue. For example, FIG. 7 depicts the loss of all beyond-site server-to-user-device lines, while retaining trunks 745 & 754, 746 & 764, and 756 & 765. However, the local-site server-to-user-device lines, and trunks 745 & 754, 746 & 764, and 756 & 765, all survive. Therefore, the collective conference continues to provide full calling and conferencing services.

In an embodiment, if the system 6000 depicted in FIG. 8 lost connectivity on many beyond-site server-to-user-device lines, and also lost all trunks, the collective conference would continue. For example, FIG. 6 depicts the loss of all except site 100—beyond-site server-to-user-device lines, plus the loss of all the inter-server trunks 745 & 754, 746 & 764, and 756 & 765. However, the site 100 server 190 server-to-user-device lines 140 & 160, 142 & 162, 144 & 164, 146 & 166, and 148 & 168 survive. Therefore, the collective conference continues to provide full calling and conferencing services.

In an embodiment, one or more user-devices, one or more servers, or any combination thereof of a conferencing system may be moving relatively or absolutely with respect to each to other while participating in a collective conference. Due to this mobility, a line used by the one or more user devices or one or more servers may become unsuitable for participating in the collective conference. However, the collective conference can be maintained between the user devices and/or servers using the approaches discussed herein, despite path losses due to the mobility, because the manual or automatic dynamic reconfiguration of the user devices or server networks can immediately restore participation and reconstitute the conferencing. The reconfiguration can occur, for example, by using emergency dialing and/or forking, other active lines, or other inactive lines. Also because of the potential mobility of users or the potential mobility of servers or the potential mobility of both users and servers, a given user's line may be served by different servers over the duration of the collective conference. As connectivity between a given user's line and a supporting server becomes unsuitable, such as due to mobility, availability, reliability, QoS, or any other consideration, other servers with suitable connectivity may be, or become, available. In an embodiment, each available or employed user line would continuously assess the viability of its connections to its current and potential servers, and manually or automatically select and leverage the most suitable connection, based on the same or equivalent considerations.

For example, a user may be carrying a mobile phone that is participating in a collective conference provided by a server on a satellite, a server on an airplane, and a server located at a facility in a fixed location. If the mobile phone is actively using a first line to connect with the satellite, but the satellite becomes unreachable due its travelling to the other side of the planet, the mobile phone can continue to participate in the conference via the server on the airplane using a second line. Should the server on the airplane also become unreachable due to its travel, the mobile phone can continue to participate in the conference via the server at the facility using a third line. Later in the duration of the collective conference, as the mobile user approaches, or acquires connectivity to, a fixed server which is supporting the collective conference, the first line may register and connect with that fixed server. And still later, when a participating server on a mobile vehicle comes into range or connectivity, the second line of the mobile user may register and connect with that server in support of the collective conference. In this way, the quantity of a user's lines participating in a collective conference may change over the duration of the collective conference, and the pairing of the individual lines with the individual servers may also change over the duration of the collective conference. In an embodiment, the user device continuously seeks to optimize the user lines and their connections and QoS, with an optimal plurality of available and suitable servers, dynamically over the duration of the collective conference.

In an embodiment, if participants in a two or more party call or a shared conference do not have a common language or code for sharing or exchanging media or other information, translation or transcoding can be employed between the different participants and their associated languages, codes and CODECs.

A code can refer to a specific way of representing or conveying particular types of media, signaling, or other information, for example, by employing a designated format, manner, or structure, and with a common or shared understanding among the users of the code. Examples include the International Telegraph Alphabet No. 2 (ITA2), a.k.a. radio-teletype, International Telegraph Alphabet No. 5 (ITA5), American Standard Code for Information Interchange (ASCII), frequency modulation (FM) radio broadcast audio, languages such as English, GSM (Global System for Mobile communications), and many others. The term code may also refer to other included, shared, exchanged, or associated elements and activities, including but not limited to formats, protocols, signaling, static and dynamic configurations, connection establishment and maintenance, connection negotiation and modification, and any other shared or exchanged information.

A CODEC refers to a physical or virtual device or functionality that encodes and/or decodes media, signaling, or other information or elements, between different systems, domains, or other entities. CODEC functionalities may include or be associated with, but are not limited to, sources, destinations, transport, storage, modification, and any other related activity or functionality, any or all portions of which may be implemented within, outside, or any combination thereof, physical or virtual user devices, servers, processors, or other functionalities, or any combination thereof.

For effective interoperability among participants in survivable conferencing, the selection and management of the codes and CODECs, and leverage of transcoding as necessary, are critical issues. For example, voice conferencing employing VoIP protocols may choose from many available voice CODECs. Example candidates include LPC10 (Linear Predictive Coding), CELP (Code-Excited Linear Predictive, a.k.a. Federal Standard 1016), GSM (Global System for Mobile communications), ITU G.711, ITU G.722, and many others. These CODECs offer a great variety of performance characteristics, such as speech clarity and quality, data rate requirements, resilience to errors and delays, and other considerations. In addition, the designation of a conference-wide CODEC may be fixed, or it may be changed dynamically, based on such factors as changing operational or environmental or network conditions, the nature and roles of the participants, and other drivers.

A transcoder refers to a physical or virtual device or functionality that provides a conversion, translation, or other processing between two or more systems or domains employing different codes. A transcoder may be employed to provide or enhance the interoperability among associated systems, domains, or functionalities which employ different codes.

In an embodiment, the transcoding can occur at one, several, or all of the participating user devices. For example, if a user device receives information in a particular coding format, and it is unable or unwilling to employ it, or prefers to employ a different coding format, the user device can employ a suitable transcoding solution. For example, if a text printer received a digital text document in the ITA2 code, a.k.a. radio-teletype, but prefers to or must process the information in the ITA5 code, a.k.a. ASCII, it would employ a radio-teletype to ASCII transcoder. For example, if a voice user device is participating in a voice conference that is employing the G.711 CODEC, but prefers to or must process the information in the GSM code, it would employ a G.711 to GSM transcoder.

While transcoding offers certain solutions, advantages and other opportunities, it also presents associated costs, such as resources, processing load, and other considerations. Transcoding between certain codes may also present significant loss of voice quality. Transcoding between high fidelity codes, typically requiring high data rates, such as G.711, G.722, et al, may present minimal voice quality impairments. However, transcoding between lower fidelity codes, typically requiring low data rates often due to constrained channels, such as LPC10, CELP, et al, may present significant voice quality impairment. In order to preserve viable voice quality, the selection of transcoding options, especially between very low data rate codes, should be carefully considered and evaluated in each implementation.

In an embodiment, the transcoding can occur at the server. Provision of transcoding at the server may offer significant advantages for call, conference, system, and other associated elements, including such as efficiencies, enhanced interoperability and performance, commonality, standardization, and others.

Several transcoding options can be available during a conference. In an embodiment, the server can transcode as necessary, using a standard offer/answer SDP-based negotiation or any other suitable functionalities between each individual user device and the server, on each conference connection or line, or on a line-by-line basis, for any or all of the participating user devices. This individualized approach can result in significant transcoding activities by the conferencing system. This may be challenging with a large quantity of lines, which may involve cumulative processor loading and resource utilization, delays, inefficiencies, and other issues.

A base CODEC for a conference refers to the common CODEC or code used for the conference and which is employed in the media mixing, information merging, or other functionalities. For an example, voice conference audio may be mixed prior to broadcasting the collective audio stream back out to all of the participants. A conference may employ the same or different codes, and CODECs, for the conference-wide selection, the base CODEC or merging selection, or any combination thereof. This CODEC selection option can be particularly beneficial for conference call participants that have a relatively limited connectivity, a constrained access link, who operate under adverse or severe operational mission or environmental conditions, or other similar circumstances.

In an embodiment, a conference-wide code preference, commonly referred to by the identity of the CODEC employed, can be manually or automatically selected by the conference host, server, management console, or other C&M functionality, such as a most common, best common, highest quality, or other criteria, or by policy or practice.

In an embodiment, the code or CODEC can be selected by external factors, often not related to internal technical performance, system interoperability, or similar metrics, such as organizational, political, economic, or other criteria. For example, the CODEC selection can be determined by the CODEC preference of the highest ranking member of the conference.

In an embodiment, the CODEC can be selected by operational mission or environmental factors, such as urgency of essential participants or information. For example, the CODEC selection can be determined by the CODEC preference of the user with the most vital messages or information, most constrained communications channel, or the poorest quality of service experience. A directory system, presence system, any other suitable references, or any combination thereof, can be configured or employed, so that the relative rank or other selection criteria of all the users is specified.

The CODEC selection may be static, such as determined at conference setup, or dynamic, with changes as needed during the conference. For example, a conference may be configured to select a base CODEC adaptively, to match the CODEC employed by the participant with highest rank, such as to provide maximal quality to Senior Leaders. In this case, as participants join and leave the conference, the highest ranking participant may change over time, and each of them may employ different CODECs. Consequently, the base CODEC for the conference call may change over the duration of the conference. For another example, if two or more participants share the highest rank (for example, three two-star generals), the CODEC preference of the first, or latest, or most common, of the equally highest ranking participants might serve as the base CODEC of the conference call. Many methodologies may be used to determine the selection criteria and metrics, including but not limited to such examples as organizational hierarchical or military precedence and preemption (P&P) procedures.

As an additional example, if the quality of service monitoring of a participant's call line or connectivity indicates poor quality, and they are employing a different CODEC than the conference-wide or base CODEC, the addition of transcoding may introduce additional quality loss or performance impediments, as previously mentioned. Changing the conference CODEC to match that user CODEC may offer relatively optimal or potentially preferable system performance and user acceptance. In such cases, avoiding the transcoding would involve use of the CODEC preference of this participant as the CODEC for the conference call. Quality of service monitoring can be implemented manually or automatically, or both, in a variety of ways, such as real-time processing of RTCP reports, quality of service probes, error pattern analysis, signal spectral analysis, user complaints, any other ways, or any combination thereof.

In an embodiment, the CODEC selection may be dynamically changed during the conference, based on variable criteria, such as the flow of, and urgency of, the information. For example, when the poor quality leg or line is being used, for example, to receive or transmit urgent conference media or other information, that line's lower-quality CODEC is used to determine the selection of the conference base CODEC. For example, when the poor quality leg or line is not being used, or perhaps when its associated urgency or other criteria changes, that line's lower-quality CODEC is no longer used to determine the selection of conference base CODEC.

Various embodiments can be implemented, for example, using one or more well-known physical or virtual media or information processing methods, technologies, computer systems, or any combinations thereof, such as computer system 5000 shown in FIG. 5. Computer system 5000 can be any well-known computer capable of performing the functions described herein, such as computers available from International Business Machines, Apple, Sun, HP, Dell, Sony, Toshiba, etc.

Computer system 5000 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos. A GPU is often leveraged to perform highly specialized and computationally intensive operations, thereby relieving the main CPU from these tasks, for which it may be slower, less efficient, or even unable. A GPU may also be employed for almost any other specialized mathematical application, such as media or information fusion or management, such as voice conferencing, plus services as an signal analog to digital converter (ADC), digital to analog converter (DAC), format or protocol encoder and decoder (CODEC), compression and expansion, error correction decoding and encoding, information security related forms of encryption and decryption, etc.

Computer system 5000 also includes user input/output device(s) 503, such as monitors, keyboards, pointing devices, speakers or earphones, microphones, cameras, sensors, and many others, etc., which communicate with communication infrastructure 506 through user or system input/output interface(s) 502.

Computer system 5000 also includes a main or primary memory 508, such as random access memory (RAM). Main memory 508 may include one or more levels of cache. Main memory 508 has stored therein control logic (i.e., computer software) and/or data.

Computer system 5000 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 5000 may further include none, one, or many communications or network interfaces 524. Communication interface 524 enables the computer system 5000 to communicate and interact with any combination of remote devices, remote networks, remote entities, other computer systems, etc. (individually and collectively referenced by reference number 528). For example, communication interface 524 may allow computer system 5000 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 5000, main memory 508, secondary memory 510, and removable storage units 518 and 522, as well as tangible articles of manufacture embodying any combination of the foregoing. Such control logic, when executed by one or more data processing devices (such as computer system 5000), causes such data processing devices to operate as described herein.

Based on the teachings contained in this disclosure, it will be apparent to persons skilled in the relevant art(s) how to make and use the invention using physical or virtual data processing devices, computer systems and/or computer architectures other than that shown in FIG. 5. In particular, embodiments may operate with software, hardware, and/or operating system implementations other than those described herein.

Conclusion

It is to be appreciated that the Detailed Description section, and not the Summary and Abstract sections, is intended to be used to interpret the claims. The Summary and Abstract sections may set forth one or more but not all exemplary embodiments of the invention as contemplated by the inventors, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," "an example," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

Table of Acronyms
  COTS Commercial Off The Shelf
  CODEC Coder/decoder
  CPU Central Processing Unit
  FDX Full Duplex
  GPU Graphics Processing Unit
  GSM Global System for Mobile Communications
  GUI Graphical User Interface
  HDX Half Duplex
  IAX2 Inter-Asterisk eXchange version 2
  IETF Internet Engineering Task Force
  IP Internet Protocol
  ITU International Telecommunications Union
  LAN Local Area Network
  LPC10 Linear Predictive Coding
  PBX Private Branch eXchange
  POTS Plain Old Telephone Service
  QoS Quality of Service
  RAM Random Access Memory
  RFC Request For Comment
  RTP Real-time Transport Protocol RTCP RTP Control Protocol
SDP Session Description Protocol
SIP Session Initiation Protocol
WAN Wide Area Network
VoIP Voice over IP

What is claimed is:

1. A method for providing a survivable sub-conference, comprising:
providing, by a first server, the survivable sub-conference to a plurality of devices over a first connection and a second connection, wherein the first server comprises a first trunk element associated with the first connection and a second trunk element associated with the second connection and wherein the plurality of devices comprises a first set of user devices and a second set of user devices;
receiving, by the first trunk element over the first connection, input information from a first set of user devices of the plurality of devices;
processing, by the first trunk element, the input information to form sub-conference information;
providing, by the first trunk element, the sub-conference information to the second trunk element; and
outputting, by the second trunk element over the second connection, the sub-conference information to the plurality of devices.

2. The method of claim 1, wherein the first set of devices are connected to the first server and the second set of user devices are connected to the first server and a second server.

3. The method of claim 2, further comprising:
providing, by the first trunk element over a first trunk connection, the input information to a third trunk element of the second server; and
receiving, by the second trunk element over a second trunk connection, second input information from a fourth trunk element of the second server.

4. The method of claim 3, further comprising:
updating the sub-conference information by combining, by the second trunk element, the second input information and the sub-conference information.

5. The method of claim 3, wherein the first and second trunk connections are unidirectional.

6. The method of claim 1, wherein the plurality of devices further comprises a third set of user devices that is connected to the first server and a third server.

7. The method of claim 1, wherein the input information comprises information provided by each device of the first set of devices.

8. A system for providing a survivable conference, comprising:
a memory;
a first trunk element;
a second trunk element; and
at least one processor coupled to the memory and configured to:
provide a survivable sub-conference to a plurality of devices over a first connection and a second connection, wherein the first trunk element is associated with the first connection and the second trunk element is associated with the second connection and wherein the plurality of devices comprises a first set of user devices and a second set of user devices;
receive, by the first trunk element over the first connection, input information from a first set of user devices of the plurality of devices;
process, by the first trunk element, the input information to form sub-conference information;
provide, by the first trunk element, the sub-conference information to the second trunk element; and
output, by the second trunk element over the second connection, the sub-conference information to the plurality of devices.

9. The system of claim 8, wherein the first set of devices are connected to the first server and the second set of user devices are connected to the first server and a second server.

10. The system of claim 9, the at least one processor further configured to:
provide, by the first trunk element over a first trunk connection, the input information to a third trunk element of the second server; and
receive, by the second trunk element over a second trunk connection, second input information from a fourth trunk element of the second server.

11. The system of claim 10, the at least one processor further configured to:
update the sub-conference information by combining, by the second trunk element, the second input information and the sub-conference information.

12. The system of claim 10, wherein the first and second trunk connections are unidirectional.

13. The system of claim 8, wherein the plurality of devices further comprises a third set of user devices that is connected to the first server and a third server and wherein to output the sub-conference information, the at least one processor is further configured to:
transport, from the second trunk element over a third connection, the sub-conference information to the third set of user devices.

14. A non-transitory computer-readable device having instructions stored thereon that, when executed by at least one computing device, cause the at least one computing device to perform operations comprising:
providing, by a first server, a survivable sub-conference to a plurality of devices over a first connection and a second connection, wherein the first server comprises a first trunk element associated with the first connection and a second trunk element associated with the second connection and wherein the plurality of devices comprises a first set of user devices and a second set of user devices;
receiving, by the first trunk element over the first connection, input information from a first set of user devices of the plurality of devices;
processing, by the first trunk element, the input information to form sub-conference information;
providing, by the first trunk element, the sub-conference information to the second trunk element; and
outputting, by the second trunk element over the second connection, the sub-conference information to the plurality of devices.

15. The non-transitory computer-readable device of claim 14, wherein the first set of devices are connected to the first server and the second set of user devices are connected to the first server and a second server.

16. The non-transitory computer-readable device of claim 15, the operations further comprising:
providing, by the first trunk element over a first trunk connection, the input information to a third trunk element of the second server; and
receiving, by the second trunk element over a second trunk connection, second input information from a fourth trunk element of the second server.

17. The non-transitory computer-readable device of claim 16, the operations further comprising:

updating the sub-conference information by combining, by the second trunk element, the second input information and the sub-conference information.

18. The non-transitory computer-readable device of claim 16, wherein the first and second trunk connections are unidirectional.

19. The non-transitory computer-readable device of claim 14, wherein the plurality of devices further comprises a third set of user devices that is connected to the first server and a third server.

20. The non-transitory computer-readable device of claim 14, wherein the input information comprises information provided by each device of the first set of devices and wherein processing the input information comprises:
  merging the information provided by each device of the first set of devices to form the input information.

* * * * *